(12) United States Patent
Sasaki et al.

(10) Patent No.: US 11,180,633 B2
(45) Date of Patent: *Nov. 23, 2021

(54) RESIN COMPOSITION, RESIN MOLDED ARTICLE, AND METHOD OF PRODUCING RESIN MOLDED ARTICLE

(71) Applicant: FUJIFILM Corporation, Tokyo (JP)

(72) Inventors: Daisuke Sasaki, Shizuoka (JP); Yoshihiro Jimbo, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/558,319

(22) Filed: Sep. 3, 2019

(65) Prior Publication Data

US 2020/0002504 A1 Jan. 2, 2020

Related U.S. Application Data

(63) Continuation of application No. PCT/JP2018/009558, filed on Mar. 12, 2018.

(30) Foreign Application Priority Data

Mar. 15, 2017 (JP) .............................. JP2017-050488

(51) Int. Cl.
| | |
|---|---|
| C08K 5/3415 | (2006.01) |
| C08L 67/00 | (2006.01) |
| C08L 75/04 | (2006.01) |
| C08L 77/00 | (2006.01) |

(52) U.S. Cl.
CPC ............ *C08K 5/3415* (2013.01); *C08L 67/00* (2013.01); *C08L 75/04* (2013.01); *C08L 77/00* (2013.01); *C08L 2203/12* (2013.01)

(58) Field of Classification Search
CPC ....... C08K 5/3415; C08L 67/00; C08L 75/04; C08L 77/00; C08L 2203/12
USPC .......................................................... 524/105
See application file for complete search history.

(56) References Cited

U.S. PATENT DOCUMENTS

| | | | |
|---|---|---|---|
| 7,902,282 B2 | 3/2011 | Sato et al. | |
| 8,460,858 B2 | 6/2013 | Maeda et al. | |
| 9,897,731 B2 | 2/2018 | Katoh et al. | |
| 10,273,251 B2 | 4/2019 | Sasaki et al. | |
| 10,732,333 B2 | 8/2020 | Norizuki et al. | |
| 10,901,123 B2 | 1/2021 | Arayama et al. | |
| 2011/0082246 A1 | 4/2011 | Sato et al. | |
| 2016/0200970 A1 | 7/2016 | Sakurai et al. | |
| 2016/0271273 A1 | 9/2016 | Sakurai et al. | |
| 2017/0174869 A1* | 6/2017 | Arayama | G02B 5/223 |
| 2018/0017722 A1 | 1/2018 | Arimura et al. | |
| 2018/0136379 A1 | 5/2018 | Takishita et al. | |
| 2018/0356573 A1 | 12/2018 | Arayama et al. | |

FOREIGN PATENT DOCUMENTS

| | | |
|---|---|---|
| CN | 101163771 | 4/2008 |
| CN | 102224204 | 10/2011 |
| CN | 104662453 | 5/2015 |
| CN | 105308124 | 2/2016 |
| JP | 2000178809 | 6/2000 |
| JP | 2003155641 | 5/2003 |
| JP | 2009062652 | 3/2009 |
| JP | 2014021421 | 2/2014 |
| JP | 2015-240371 A | * 12/2014 |
| JP | 2014240371 | 12/2014 |
| JP | 2015101815 | 6/2015 |
| JP | 2017181705 | 10/2017 |
| TW | 201609991 | 3/2016 |
| WO | 2015022977 | 2/2015 |
| WO | 2015056779 | 4/2015 |
| WO | 2015166873 | 11/2015 |
| WO | 2016031810 | 3/2016 |
| WO | 2016035695 | 3/2016 |
| WO | WO 2016/035695 | * 3/2016 |
| WO | 2016158819 | 10/2016 |
| WO | 2017018004 | 2/2017 |
| WO | 2017146092 | 8/2017 |
| WO | 2018056127 | 3/2018 |

OTHER PUBLICATIONS

JP 2015-240371, Tokiyoshi et al., Dec. 2014 (English Translation).*
"Office Action of Japan Counterpart Application," with English translation thereof, dated Jan. 14, 2020, p. 1-p. 6.
"International Search Report (Form PCT/ISA/210) of PCT/JP2018/009558", dated Jun. 12, 2018, with English translation thereof, pp. 1-4.
"Written Opinion of the International Searching Authority (Form PCT/ISA/237) of PCT/JP2018/009558", dated Jun. 12, 2018, with English translation thereof, pp. 1-9.
Office Action of China Counterpart Application, with English translation thereof, dated Jan. 27, 2021, pp. 1-14.
Yoko Aoyagi, et al., "Case Studies on Food-related Complaints, Apr. 2006-Mar. 2009, Tama," Annual report of Tokyo Metropolitan Institute of Public Health, No. 60, 2009, pp. 1-7.
Morihiro Sada, "About the Food Safety. (3) Sediments Hazard and the Measures (1) Sediments Occurred from Ingredients, Environments and Workers," Journal of Japan Society for Safety Engineering, Japan Society for Safety Engineering, 2010, vol. 49, No. 5, pp. 1-8.
Sumio Kawano, "Present situation and issues of non-destructive inspection regarding foreign substances and hazards in food," Journal of food system research, Oct. 2005, vol. 12, Issue 2, pp. 1-12.
DIC Corporation, "DIC announces that it is developing an innovative near infrared-based food contaminant detection system with Mitsui Kinzoku Instrumentations Technology—Innovative technology responds to food safety-related needs—," news release on Sep. 13, 2016, searched on Nov. 11, 2020. available at: https://www.dic-global.com/ja/news/2016/products/20161226000000.html.

(Continued)

Primary Examiner — William K Cheung
(74) Attorney, Agent, or Firm — JCIPRNET

(57) ABSTRACT

Provided are a resin composition including at least one near infrared absorbing coloring agent selected from compounds represented by Formula (1), and a resin, in which a content of the near infrared absorbing coloring agent is in a range of 0.3% by mass to 5% by mass with respect to a total amount of the resin composition, a resin molded article, and a method of producing a resin molded article. The details of the reference numerals of the compounds are as described in the specification.

6 Claims, No Drawings

(56) References Cited

OTHER PUBLICATIONS

"Notice of Opposition of Japanese Counterpart Application," dated Dec. 4, 2020, with English translation thereof, p. 1-p. 68.
Notice of Reasons for Revocation of Patent of Japan Counterpart Application, with partial English translation thereof, dated Apr. 7, 2021, pp. 1-52.
Ting Tung et al., "Compendium of Chemical Products in China", with partial English translation, Chemical Industry Publisher, Oct. 31, 1994, pp. 1-2.
Shanghai Wujing Chemical Works., "Producing a filling and molding material using sulfuric acid sludge", with partial English translation, Shanghai People's Publisher, Jun. 30, 1975, pp. 1-2.
Office Action of China Counterpart Application, with English translation thereof, dated Jul. 22, 2021, pp. 1-13.

\* cited by examiner

RESIN COMPOSITION, RESIN MOLDED ARTICLE, AND METHOD OF PRODUCING RESIN MOLDED ARTICLE

CROSS-REFERENCE TO RELATED APPLICATIONS

This application is a continuation application of International Application No. PCT/JP2018/009558, filed Mar. 12, 2018, which is incorporated herein by reference. Further, this application claims priority from Japanese Patent Application No. 2017-050488, filed Mar. 15, 2017, which is incorporated herein by reference.

BACKGROUND OF THE INVENTION

1. Field of the Invention

The present disclosure relates to a resin composition, a resin molded article, and a method of producing a resin molded article.

2. Description of the Related Art

In recent years, development of various applications for utilizing characteristics of near infrared absorbing coloring agents, for example, characteristics of absorbing light in an infrared region, characteristics of shielding light in the infrared region, and characteristics of absorbing light in the infrared region and converting the light to heat has been suggested.

For example, a heat-ray shielding sheet which is a sheet containing a phthalocyanine compound having a specific structure and is attached to window glass so that an increase in indoor temperature is suppressed has been suggested (see JP2014-021421A). A dyeing method of immersing fibers in a dye bath that contains a chromium metal-containing dye specific to a metal mordant dye to obtain infrared absorbing fibers which have an infrared reflectivity of 30% or less and are capable of preventing transmission of infrared rays into clothes at the time of infrared ray imaging has been suggested (see JP2009-062652A). Further, functional fibers which are thermoplastic fibers containing far infrared radioactive fine particles and formed by a near infrared absorbing agent adhering to the surface of each fiber, and thermal insulating fabric have been suggested (see JP2015-101815A).

SUMMARY OF THE INVENTION

As the near infrared absorbing coloring agents are used in various applications, the characteristics of invisibility and heat resistance have become important. In a case where a near infrared absorbing coloring agent is a coloring agent having a large absorption amount in a visible region visible to human eyes, for example, the appearance of a resin composition containing the near infrared absorbing coloring agent change in some cases depending on whether the near infrared absorbing coloring agent has been added or the content of the near infrared absorbing coloring agent. Further, the appearance of a resin molded article prepared using the resin composition also changes. Therefore, it is preferable that the infrared absorbing coloring agent used for a resin composition has a small absorption amount in a visible region. The characteristic in which the near infrared absorbing coloring agent has a small absorption amount in a visible region is referred to as invisibility.

Further, the resin composition containing the near infrared absorbing coloring agent is heated and molded in some cases of being processed into a sheet or a pellet. Accordingly, the near infrared absorbing coloring agent used in the resin composition is required to have heat resistance in order to withstand the thermal molding temperature.

Examples of known near infrared absorbing coloring agents include cyanine, phthalocyanine, anthraquinone, and diimmonium. Cyanine and diimmonium have excellent invisibility, but are decomposed in some cases of being heated to the thermal molding temperature because the heat resistance thereof is low. Therefore, there is a problem in that the obtained resin molded article cannot achieve desired near infrared absorption capacity in some cases due to the decomposition of the near infrared absorbing coloring agent.

Phthalocyanine, anthraquinone, and the like as near infrared absorbing coloring agents have excellent heat resistance, but the invisibility is low because phthalocyanine, anthraquinone, and the like absorb near infrared rays in a visible region.

An object of an embodiment of the present invention is to provide a resin composition which contains a near infrared absorbing coloring agent and in which the infrared absorption capacity is maintained for a long time without changing the tint of the resin and degradation of the infrared absorption capacity is suppressed even in a case where the composition is provided for heat molding.

Further, another object of another embodiment of the present invention is to provide a resin molded article in which degradation of the infrared absorption capacity is suppressed even after heat molding without changing the tint of the resin serving as a base material, and a method of producing the resin molded article.

Specific means for achieving the above-described objects include the following embodiments.

<1> A resin composition comprising: at least one near infrared absorbing coloring agent selected from compounds represented by Formula (1); and a resin, in which a content of the near infrared absorbing coloring agent is in a range of 0.3% by mass to 5% by mass with respect to a total amount of the resin composition.

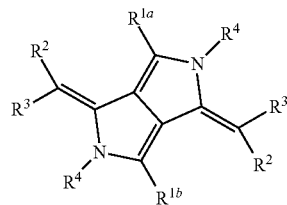

(1)

In Formula (1), $R^{1a}$ and $R^{1b}$ each independently represent an alkyl group, an aryl group, or a heteroaryl group.

A plurality of $R^2$'s and $R^3$'s each independently represent a hydrogen atom or a monovalent substituent, and at least one of $R^2$ or $R^3$ represents an electron-withdrawing group. $R^2$ and $R^3$ may be bonded to each other to form a ring. A plurality of $R^4$'s each independently represent a hydrogen atom, an alkyl group, an aryl group, a heteroaryl group, substituted boron, or a metal atom, and $R^4$ may be bonded to at least one selected from $R^{1a}$, $R^{1b}$, or $R^3$ through a covalent bond or a coordinate bond.

<2> The resin composition according to <1>, in which the compound represented by Formula (1) is a compound represented by Formula (3).

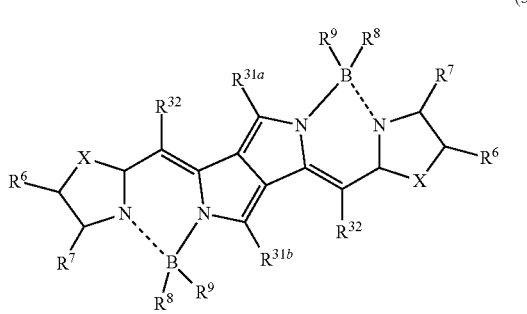

(3)

In Formula (3), a plurality of $R^{31a}$'s and $R^{31b}$'s each independently represent an alkyl group, an aryl group, or a heteroaryl group.

A plurality of $R^{32}$'s represent a hydrogen atom or a monovalent substituent, at least one $R^{32}$ represents an electron-withdrawing group. A plurality of $R^{6}$'s and $R^{7}$'s each independently represent a hydrogen atom, an alkyl group, an aryl group, or a heteroaryl group, and $R^{6}$ and $R^{7}$ may be bonded to each other to form a ring. A plurality of $R^{8}$'s and $R^{9}$'s each independently represent an alkyl group, an alkoxy group, an aryl group, or a heteroaryl group.

A plurality of X's each independently represent an oxygen atom, a sulfur atom, —NR—, or CRR'—, and R and R' each independently represent a hydrogen atom, an alkyl group, or an aryl group.

<3> The resin composition according to <1> or <2>, in which the resin contains at least one selected from polyester, polyamide, or polyurethane.

<4> The resin composition according to any one of <1> to <3>, further comprising: a colorant.

<5> A resin molded article which is prepared by using a resin composition comprising: at least one near infrared absorbing coloring agent selected from compounds represented by Formula (1); and a resin, in which a content of the near infrared absorbing coloring agent is in a range of 0.3% by mass to 5% by mass with respect to a total amount of the resin composition.

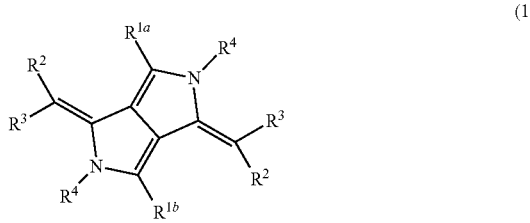

(1)

In Formula (1), $R^{1a}$ and $R^{1b}$ each independently represent an alkyl group, an aryl group, or a heteroaryl group.

A plurality of $R^{2}$'s and $R^{3}$'s each independently represent a hydrogen atom or a monovalent substituent, and at least one of $R^{2}$ or $R^{3}$ represents an electron-withdrawing group. $R^{2}$ and $R^{3}$ may be bonded to each other to form a ring. A plurality of $R^{4}$'s each independently represent a hydrogen atom, an alkyl group, an aryl group, a heteroaryl group, substituted boron, or a metal atom, and $R^{4}$ may be bonded to at least one selected from $R^{1a}$, $R^{1b}$, or $R^{3}$ through a covalent bond or a coordinate bond.

<6> The resin molded article according to <5>, which is a synthetic fiber.

<7> A method of producing a resin molded article, comprising: a step of kneading at least one near-infrared absorbing coloring agent selected from compounds represented by Formula (1) and a resin to obtain a resin kneaded material; and a step of molding the obtained resin kneaded material.

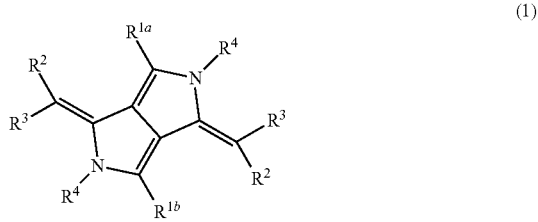

(1)

In Formula (1), $R^{1a}$ and $R^{1b}$ each independently represent an alkyl group, an aryl group, or a heteroaryl group.

A plurality of $R^{2}$'s and $R^{3}$'s each independently represent a hydrogen atom or a monovalent substituent, and at least one of $R^{2}$ or $R^{3}$ represents an electron-withdrawing group. $R^{2}$ and $R^{3}$ may be bonded to each other to form a ring. A plurality of $R^{4}$'s each independently represent a hydrogen atom, an alkyl group, an aryl group, a heteroaryl group, substituted boron, or a metal atom, and $R^{4}$ may be bonded to at least one selected from $R^{1a}$, $R^{1b}$, or $R^{3}$ through a covalent bond or a coordinate bond.

According to an embodiment of the present invention, it is possible to provide a resin composition which contains a near infrared absorbing coloring agent and in which the infrared absorption capacity is maintained for a long time without changing the tint of the resin and degradation of the infrared absorption capacity is suppressed even in a case where the composition is provided for heat molding.

Further, according to another embodiment of the present invention, it is possible to provide a resin molded article in which degradation of the infrared absorption capacity is suppressed even after heat molding without changing the tint of the resin serving as a base material, and a method of producing the resin molded article.

DESCRIPTION OF THE PREFERRED EMBODIMENTS

Hereinafter, a resin composition, a resin molded article, and a method of producing a resin molded article according to the embodiment of the present disclosure will be described in detail.

In the present specification, the numerical ranges shown using "to" indicate ranges including the numerical values described before and after "to" as the lower limits and the upper limits.

In the present specification, in a case where the amount of each component in a composition is mentioned and a plurality of substances corresponding to each component in the composition are present, the amount of each component indicates the total amount of the plurality of components present in the composition.

In a numerical range described in a stepwise manner in the present specification, an upper limit or a lower limit described in one numerical range may be replaced with an upper limit or a lower limit in another numerical range described in a stepwise manner. Further, in a numerical range described in the present specification, an upper limit or a lower limit described in the numerical range may be replaced with a value described in an example.

In the present specification, a combination of preferred aspects is a more preferred aspect.

The term "solid content" in the present specification indicates a component excluding a solvent, and a liquid component such as a low-molecular-weight component other than a solvent is also included in the "solid content" in the present specification.

In the present specification, a "solvent" indicates water, an organic solvent, or a mixed solvent of water and an organic solvent.

Further, in the present specification, any one or both of acryl and methacryl are noted as "(meth)acryl" in some cases.

The "steps" in the present specification include not only independent steps but also steps whose intended purposes are achieved even in a case where the steps cannot be precisely distinguished from other steps.

<Resin Composition>

A resin composition according to the embodiment of the present disclosure is a resin composition including at least one near infrared absorbing coloring agent selected from compounds represented by Formula (1) (hereinafter, also referred to as a compound (1)), and a resin, in which the content of the near infrared absorbing coloring agent is in a range of 0.3% by mass to 5% by mass with respect to the total amount of the resin composition.

Further, in the present specification, at least one near infrared absorbing coloring agent selected from the compound (1) is also referred to as a specific infrared absorbing coloring agent.

The term "resin composition" in the present specification is used to include a resin composition formed by mixing a specific near infrared absorbing coloring agent with a resin and a resin composition containing a resin and a specific near infrared absorbing coloring agent which is formed by adhering the specific near infrared absorbing coloring agent to the resin using a method of performing coating, immersion, or the like.

The mechanism of the resin composition according to the embodiment of the present disclosure is not clear, but is assumed as follows.

Since the near infrared absorbing coloring agent selected from the compounds (1) does not show absorption in a visible region or absorbs an extremely small quantity of near infrared rays, the near infrared absorbing coloring agent has excellent invisibility in the visual inspection. Therefore, the resin composition containing the specific near infrared absorbing coloring agent is a resin composition having original transparency of the resin or a resin composition which does not impair the tint of a colorant to be combined as desired. Accordingly, the resin composition according to the embodiment of the present disclosure can be provided for production of various molded articles having excellent near infrared absorption capacity depending on the purpose thereof.

Further, it is considered that since the near infrared absorbing coloring agent selected from the compounds (1) shows large absorption in a near infrared region and has excellent heat resistance, the resin composition according to the embodiment of the present disclosure can maintain excellent infrared absorption capacity even in a case of being subjected to molding processing accompanied by heating such as heating, melting, and kneading.

Accordingly, the resin composition according to the embodiment of the present disclosure can be used to form various molded articles such as a security system for the purpose of preventing forgery through near infrared detection, an infrared-absorbing film, and heat storage synthetic fibers.

Further, the disclosure is not limited by the assumed mechanism.

First, the compound (1) serving as the near infrared absorbing coloring agent in the resin composition according to the embodiment of the present disclosure will be described.

[Compound Represented by Formula (1): Compound (1)]

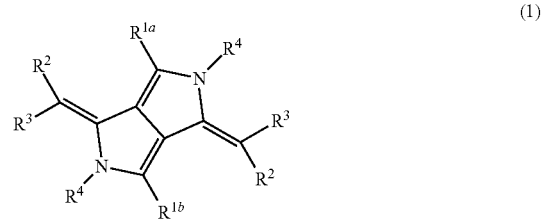

(1)

In Formula (1), $R^{1a}$ and $R^{1b}$ each independently represent an alkyl group, an aryl group, or a heteroaryl group. A plurality of $R^2$'s and $R^3$'s each independently represent a hydrogen atom or a monovalent substituent, and at least one of $R^2$ or $R^3$ represents an electron-withdrawing group. $R^2$ and $R^3$ may be bonded to each other to form a ring.

A plurality of $R^4$'s each independently represent a hydrogen atom, an alkyl group, an aryl group, a heteroaryl group, substituted boron, or a metal atom, and $R^4$ may be bonded to at least one selected from $R^{1a}$, $R^{1b}$, or $R^3$ through a covalent bond or a coordinate bond.

In Formula (1), as the alkyl group represented by $R^{1a}$ or $R^{1b}$, an alkyl group having 1 to 30 carbon atoms is preferable, an alkyl group having 1 to 20 carbon atoms is more preferable, and an alkyl group having 1 to 10 carbon atoms is still more preferable, and examples thereof include methyl, ethyl, iso-propyl, tert-butyl, n-octyl, n-decyl, n-hexadecyl, cyclopropyl, cyclopentyl, and cyclohexyl.

Further, as the aryl group represented by $R^{1a}$ or $R^{1b}$, an aryl group having 6 to 30 carbon atoms is preferable, an aryl group having 6 to 20 carbon atoms is more preferable, and an aryl group having 6 to 12 carbon atoms is still more preferable, and examples thereof include phenyl, o-methylphenyl, p-methylphenyl, biphenyl, naphthyl, anthranyl, and phenanthryl.

As the heteroaryl group represented by $R^{1a}$ or $R^{1b}$, a heteroaryl group having 1 to 30 carbon atoms is preferable, and a heteroaryl group having 1 to 12 carbon atoms is more preferable. Examples of the heteroatom include a nitrogen atom, an oxygen atom, and a sulfur atom.

Specific examples of the heteroaryl group include imidazolyl, pyridyl, quinolyl, furyl, thienyl, benzoxazolyl, benzimidazolyl, benzthiazolyl, naphthothiazolyl, m-carbazolyl, and azepinyl.

The alkyl group, the aryl group, or the heteroaryl group represented by $R^{1a}$ or $R^{1b}$ may further have a substituent.

Examples of the substituent which can be introduced to the alkyl group, the aryl group, or the heteroaryl group represented by $R^{1a}$ or $R^{1b}$ include an alkyl group, an alkenyl group, an alkynyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, an aromatic heterocyclic thio group, a sulfonyl group, a sulfinyl group, an ureido group, a phosphoric acid amide group, a hydroxy group, a mercapto group, a halogen atom, a cyano group, a sulfo group, a carboxyl group, a nitro group, a hydroxamic acid group, a sulfino group, a hydrazino group, an imino group, and a silyl group. In addition, these substituents may be further substituted.

As the substituent, a substituent selected from an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxyl group is preferable; and a substituent selected from an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, and a carboxyl group is more preferable.

Further, the "number of carbon atoms" in a substituent indicates the "total number of carbon atoms" in the substituent.

As the alkyl group, an alkyl group having 1 to 30 carbon atoms is preferable, an alkyl group having 1 to 20 carbon atoms is more preferable, and an alkyl group having 1 to 10 carbon atoms is still more preferable, and examples thereof include methyl, ethyl, iso-propyl, tert-butyl, n-octyl, n-decyl, n-hexadecyl, cyclopropyl, cyclopentyl, and cyclohexyl.

As the aryl group, an aryl group having 6 to 30 carbon atoms is preferable, an aryl group having 6 to 20 carbon atoms is more preferable, and an aryl group having 6 to 12 carbon atoms is particularly preferable, and examples thereof include phenyl, p-methylphenyl, biphenyl, naphthyl, anthranyl, and phenanthryl.

As the amino group, an amino group having 0 to 30 carbon atoms is preferable, an amino group having 0 to 20 carbon atoms is more preferable, and an amino group having 0 to 10 carbon atoms is particularly preferable, and examples thereof include an alkylamino group, an arylamino group, and a heterocyclic amino group. Specific examples thereof include amino, methylamino, dimethylamino, diethylamino, dibenzylamino, diphenylamino, and ditolylamino.

As the alkoxy group, an alkoxy group having 1 to 30 carbon atoms is preferable, an alkoxy group having 1 to 20 carbon atoms is more preferable, and an alkoxy group having 1 to 10 carbon atoms is particularly preferable, and examples thereof include methoxy, ethoxy, butoxy, and 2-ethylhexyloxy.

As the aryloxy group, an aryloxy group having 6 to 30 carbon atoms is preferable, an aryloxy group having 6 to 20 carbon atoms is more preferable, and an aryloxy group having 6 to 12 carbon atoms is particularly preferable, and examples thereof include phenyloxy, 1-naphthyloxy, and 2-naphthyloxy.

As the aromatic heterocyclic oxy group, the number of carbon atoms thereof is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy.

As the acyl group, an acyl group having 1 to 30 carbon atoms is preferable, an acyl group having 1 to 20 carbon atoms is more preferable, and an acyl group having 1 to 12 carbon atoms is particularly preferable, and examples thereof include acetyl, benzoyl, formyl, and pivaloyl.

As the alkoxycarbonyl group, an alkoxycarbonyl group having 2 to 30 carbon atoms is preferable, an alkoxycarbonyl group having 2 to 20 carbon atoms is more preferable, and an alkoxycarbonyl group having 2 to 12 carbon atoms is particularly preferable, and examples thereof include methoxycarbonyl and ethoxycarbonyl.

As the aryloxycarbonyl group, an aryloxycarbonyl group having 7 to 30 carbon atoms is preferable, an aryloxycarbonyl group having 7 to 20 carbon atoms is more preferable, and an aryloxycarbonyl group having 7 to 12 carbon atoms is particularly preferable, and examples thereof include phenyloxycarbonyl.

As the acyloxy group, an acyloxy group having 2 to 30 carbon atoms is preferable, an acyloxy having 2 to 20 carbon atoms is more preferable, and an acyloxy group having 2 to 10 carbon atoms is particularly preferable, and examples thereof include acetoxy and benzoyloxy.

As the acylamino group, an acylamino group having 2 to 30 carbon atoms is preferable, an acylamino group having 2 to 20 carbon atoms is more preferable, and an acylamino group having 2 to 10 carbon atoms is particularly preferable.

As the alkoxycarbonylamino group, an alkoxycarbonylamino group having 2 to 30 carbon atoms is preferable, an alkoxycarbonylamino group having 2 to 20 carbon atoms is more preferable, and an alkoxycarbonylamino group having 2 to 12 carbon atoms is particularly preferable, and examples thereof include methoxycarbonylamino.

As the aryloxycarbonylamino group, an aryloxycarbonylamino group having 7 to 30 carbon atoms is preferable, an aryloxycarbonylamino group having 7 to 20 carbon atoms is more preferable, and an aryloxycarbonylamino group having 7 to 12 carbon atoms is particularly preferable, and examples thereof include phenyloxycarbonylamino.

As the sulfonylamino group, a sulfonylamino group having 1 to 30 carbon atoms, a sulfonylamino group having 1 to 20 carbon atoms is more preferable, and a sulfonylamino group having 1 to 12 carbon atoms is particularly preferable, and examples thereof include methanesulfonylamino and benzenesulfonylamino.

As the alkylthio group, an alkylthio group having 1 to 30 carbon atoms is preferable, an alkylthio group having 1 to 20 carbon atoms is more preferable, and an alkylthio group having 1 to 12 carbon atoms is particularly preferable, and examples thereof include methylthio and ethylthio.

As the arylthio group, an arylthio group having 6 to 30 carbon atoms is preferable, an arylthio group having 6 to 20 carbon atoms is more preferable, and an arylthio group having 6 to 12 carbon atoms is particularly preferable, and examples thereof include phenylthiol.

As the aromatic heterocyclic thio group, an aromatic heterocyclic thio group having 1 to 30 carbon atoms is preferable, an aromatic heterocyclic thio group having 1 to 20 carbon atoms is more preferable, and an aromatic heterocyclic thio group having 1 to 12 carbon atoms is particularly preferable, and examples thereof include pyridylthio, 2-benzimidazolylthio, 2-benzoxazolylthio, and 2-benzthiazolylthio.

As the sulfonyl group, a sulfonyl group having 1 to 30 carbon atoms is preferable, a sulfonyl group having 1 to 20 carbon atoms is more preferable, a sulfonyl group having 1 to 12 carbon atoms is particularly preferable, and examples thereof include mesyl and tosyl.

Examples of the halogen atom include a fluorine atom, a chlorine atom, a bromine atom, and an iodine atom.

Examples of other substituents include a hydroxy group, a mercapto group, a cyano group, a sulfo group, a carboxyl group, a nitro group, a hydroxamic acid group, a sulfino group, a hydrazino group, and an imino group.

These substituents may be further substituted.

A plurality of $R^2$'s and $R^3$'s each independently represent a hydrogen atom or a monovalent substituent. At least one of the plurality of $R^2$'s or $R^3$'s represents an electron-withdrawing group $R^2$ and $R^3$ may be bonded to each other to form a ring.

Examples of the monovalent substituent represented by the plurality of $R^2$'s and $R^3$'s include the monovalent substituents exemplified as the substituents which can be introduced to the alkyl group, the aryl group, or the heteroaryl group represented by $R^{1a}$ and $R^{1b}$ described above.

The at least one electron-withdrawing group in the plurality of $R^2$'s and $R^3$'s is an electron-withdrawing group in which the Hammett's σp value (sigma para value) is preferably 0.2 or greater. Specific examples of the electron-withdrawing group include a cyano group, an acyl group, an alkyloxycarbonyl group, an aryloxycarbonyl group, a sulfamoyl group, a sulfinyl group, and a heterocyclic group. These electron-withdrawing groups may further include a substituent.

The Hammett's substituent constant σ value will be described. The Hammett's rule is an experimental rule proposed by L. P. Hammett (1935) in order to quantitatively discuss the influence of substituents on the reaction or equilibrium of benzene derivatives, and this rule has been widely accepted recently. The substituent constants acquired by the Hammett's rule are the σp value and the σm value, and these values can be found in general books. For example, these values are specifically described in "Lange's Handbook of Chemistry", 12th edition, edited by J. A. Dean, 1979 (Mc Graw-Hill), "Area of Chemistry", special issue, No. 122, p. 96 to 103, 1979 (Nankodo Co., Ltd.), and Chem. Rev., 1991. Vol. 91, p. 165 to 195. It is described that the substituent having a Hammett's substituent constant σp value of 0.2 or greater is an electron-withdrawing value in the present invention.

The σp value in the electron-withdrawing group is preferably 0.25 or greater, more preferably 0.3 or greater, and particularly preferably 0.35 or greater.

Specific examples of the electron-withdrawing group include a cyano group (0.66), a carboxyl group (—COOH: 0.45), an alkoxycarbonyl group (—COOMe: 0.45), an aryloxycarbonyl group (—COOPh: 0.44), a carbamoyl group (—CONH$_2$: 0.36), an alkylcarbonyl group (—COMe: 0.50), an arylcarbonyl group (—COPh: 0.43), an alkylsulfonyl group (—SO$_2$Me: 0.72), and an arylsulfonyl group (—SO$_2$Ph: 0.68).

In the present specification, a methyl group and a phenyl group are respectively abbreviated as Me and Ph in some cases. Further, the values in parentheses in the above-described electron-withdrawing groups are the σp values of representative substituents described in Chem. Rev., 1991, Vol. 91, p. 165 to 195.

Further, in a case where $R^2$ and $R^3$ are bonded to each other to form a ring, it is preferable that a 5-membered ring or a 7-membered ring (preferably a 5-membered ring or a 6-membered ring) is formed and used as an acidic nucleus for a merocyanine coloring agent as the ring to be formed. Specific examples thereof include the followings.

(a) 1,3-Dicarbonyl nucleus: such as 1,3-indandione nucleus, 1,3-cyclohexanedione, 5,5-dimethyl-1,3-cyclohexanedione, or 1,3-dioxane-4,6-dione;

(b) pyrazolinone nucleus: such as 1-phenyl-2-pyrazolin-5-one, 3-methyl-1-phenyl-2-pyrazolin-5-one, or 1-(2-benzothiazolyl)-3-methyl-2-pyrazolin-5-one;

(c) isoxazolinone nucleus: such as 3-phenyl-2-isoxazolin-5-one or 3-methyl-2-isoxazolin-5-one;

(d) oxindole nucleus: such as 1-alkyl-2,3-dihydro-2-oxindole;

(e) 2,4,6-triketohexahydropyrimidine nucleus: such as barbituric acid or 2-thiobarbituric acid, and derivatives thereof; and examples of the derivatives include a 1-alkyl body such as 1-methyl or 1-ethyl; a 1,3-dialkyl body such as 1,3-dimethyl, 1,3-diethy, or 1,3-dibutyl; a 1,3-diaryl body such as 1,3-diphenyl, 1,3-di(p-chlorophenyl), or 1,3-di(p-ethoxycarbonylphenyl); a 1-alkyl-1-aryl body such as 1-ethyl-3-phenyl; and a diheterocyclic substituent at the first and the third positions such as 1,3-di(2-pyridyl);

(f) 2-thio-2,4-thiazolidinedione nucleus: such as rhodamine and derivatives thereof; and examples of the derivatives include 3-alkylrhodanine such as 3-methylrhodanine, 3-ethylrhodanine, or 3-allylrhodanine; 3-arylrhodanine such as 3-phenylrhodanine; and heterocyclic rhodamine substituted at the third position such as 3-(2-pyridyl)rhodamine;

(g) 2-thio-2,4-oxazolidinedione(2-thio-2,4-(3H,5H)-oxazole dione nucleus: such as 3-ethyl-2-thio-2,4-oxazolidinedione;

(h) thianaphthenone nucleus: such as 3(2H)-thianaphthenone-1,1-dioxide;

(i) 2-thio-2,5-thiozolidinedione nucleus: such as 3-ethyl-2-thio-2,5-thiazolidinedione;

(j) 2,4-thiozolidinedione nucleus: such as 2,4-thiazolidinedione, 3-ethyl-2,4-thiazolidinedione, or 3-phenyl-2,4-thiazolidinedione;

(k) thiazolin-4-one nucleus: such as 4-thiazolinone or 2-ethyl-4-thiazolinone;

(l) 4-thiazolidinone nucleus: such as 2-ethylmercapto-5-thiazolin-4-one or 2-alkylphenylamino-5-thiazolin-4-one;

(m) 2,4-imidazolidinedione (hydantoin) nucleus: such as 2,4-imidazolidinedione or 3-ethyl-2,4-imidazolidinedione;

(n) 2-thio-2,4-imidazolidinedione(2-thiohydantoin) nucleus: such as 2-thio-2,4-imidazolidinedione or 3-ethyl-2-thio-2,4-imidazolidinedione;

(o) imidazolin-5-one nucleus: such as 2-propylmercapto-2-imidazolin-5-one;

(p) 3,5-pyrazolidinedione nucleus: such as 1,2-diphenyl-3,5-pyrazolidinedione, 1,2-dimethyl-3,5-pyrazolidinedione;

(q) benzothiophene-3-one nucleus: such as benzothiophene-3-one, oxobenzothiophene-3-one, or dioxobenzothiophene-3-one; and (r) indanone nucleus: such as 1-indanone, 3-phenyl-1-indanone, 3-methyl-1-indanone, 3,3-diphenyl-1-indanone, or 3,3-dimethyl-1-indanone.

Further, the σp values as $R^2$ and $R^3$ in a case of forming a ring cannot be defined. However, in the present disclosure, the σp values in the case of forming a ring are defined by assuming that a plurality of $R^2$'s and $R^3$'s are each substituted with a partial structure of the ring. For example, in a case where $R^2$ and $R^3$ form a 1,3-indandion ring, it is considered that $R^2$ and $R^3$ are each substituted with a benzoyl group.

Preferred examples of the ring to be formed by $R^2$ and $R^3$ being bonded to each other include a 1,3-dicarbonyl nucleus, a pyrazolinone nucleus, a 2,4,6-triketohexahydropyrimidine nucleus (including a thioketone body), a 2-thio-2,4-thiazolidinedione nucleus, a 2-thio-2,4-oxazolidinedione nucleus, a 2-thio-2,5-thiazolidinedione nucleus, a 2,4-thiazolidinedione nucleus, a 2,4-imidazolidinedione nucleus, a 2-thio-2,4-imidazolidinedione nucleus, a 2-imidazolin-5-one nucleus, a 3,5-pyrazolidinedione nucleus, a benzothiophene-3-one nucleus, and an indanone nucleus. Among these, a 1,3-dicarbonyl nucleus, a 2,4,6-triketohexahydropyrimidine nucleus (including a thioketone body), a 3,5-pyrazolidinedione nucleus, a benzothiophene-3-one nucleus, and indanone nucleus are more preferable.

It is particularly preferable that $R^3$ represents a heterocycle.

Two $R^2$'s in Formula (1) may be the same as or different from each other, and two $R^3$'s may be the same as or different from each other.

The alkyl group, the aryl group, or the heteroaryl group represented by $R^4$ has the same definition as the substituent described in the section of $R^{1a}$ and $R^{1b}$, and the preferable ranges thereof are the same as described above. The substituent of the substituted boron represented by $R^4$ has the same definition as the substituent described in the section of $R^2$ and $R^3$, and preferred examples thereof include an alkyl group, an aryl group, and a heteroaryl group. As the metal atom represented by $R^4$, a transition metal, magnesium, aluminum, calcium, barium, zinc, or tin is preferable, aluminum, zinc, tin, vanadium, iron, cobalt, nickel, copper, palladium, iridium, or platinum is more preferable, and aluminum, zinc, vanadium, iron, copper, palladium, iridium, or platinum is particularly preferable.

$R^4$ may be bonded to at least one selected from $R^{1a}$, $R^{1b}$, or $R^3$ through a covalent bond or a coordinate bond.

Two R4's in Formula (1) may be the same as or different from each other.

As the compound represented by Formula (1), a compound represented by any of Formulae (2), (3), and (4) is preferable. Among these, a compound represented by Formula (3) is preferable.

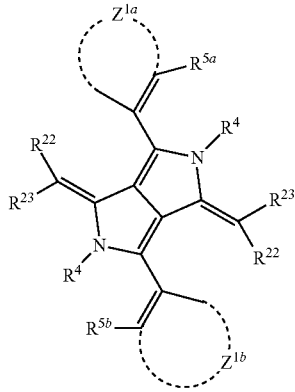

(2)

In Formula (2), $Z^{1a}$ and $Z^{1b}$ each independently represent an atomic group that forms an aryl ring or a heteroaryl ring. $R^{5a}$ and $R^{5b}$ each independently represent any one of an aryl group having 6 to 20 carbon atoms, a heteroaryl group having 4 to 20 carbon atoms, an alkyl group having 1 to 20 carbon atoms, an alkoxy group having 1 to 20 carbon atoms, an alkoxycarbonyl group having 1 to 20 carbon atoms, a carboxyl group, a carbamoyl group having 1 to 20 carbon atoms, a halogen atom, or a cyano group, and $R^{5a}$ or $R^{5b}$ and $Z^{1a}$ or $Z^{1b}$ may be bonded to form a fused ring. A plurality of $R^{22}$'s and $R^{23}$'s each independently represent a cyano group, an acyl group having 1 to 6 carbon atoms, an alkoxycarbonyl group having 1 to 6 carbon atoms, an alkyl or arylsulfinyl group having 1 to 10 carbon atoms, or a nitrogen-containing heteroaryl group having 3 to 20 carbon atoms, or $R^{22}$ and $R^{23}$ are bonded to each other and represent a cyclic acidic nucleus.

A plurality of $R^4$'s each independently represent a hydrogen atom, an alkyl group having 1 to 20 carbon atoms, an aryl group having 6 to 20 carbon atoms, a heteroaryl group having 4 to 20 carbon atoms, or a metal atom. Further, as a substituent, the plurality of $R^4$'s each independently represent a halogen atom or substituted boron containing an alkyl group having 1 to 10 carbon atoms, an aryl group having 6 to 20 carbon atoms, or a heteroaryl group having 4 to 20 carbon atoms. $R^4$ may be bonded to $R^{23}$ through a covalent bond or a coordinate bond. In addition, the compounds may further have a substituent.

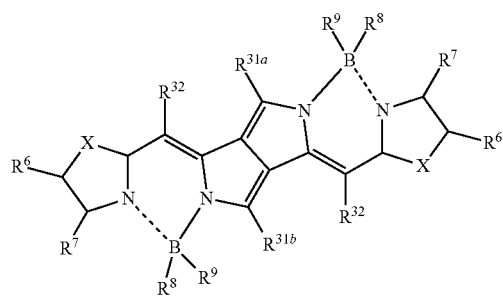

(3)

In Formula (3), $R^{31a}$ and $R^{31b}$ each independently represent an alkyl group having 1 to 20 carbon atoms, an aryl group having 6 to 20 carbon atoms, or a heteroaryl group having 3 to 20 carbon atoms. A plurality of $R^{32}$'s each independently represent a cyano group, an acyl group having 1 to 6 carbon atoms, an alkoxycarbonyl group having 1 to 6 carbon atoms, an alkyl or arylsulfinyl group having 1 to 10 carbon atoms, or a nitrogen-containing heteroaryl group having 3 to 10 carbon atoms. A plurality of $R^6$'s and $R^7$'s each independently represent a hydrogen atom, an alkyl group having 1 to 10 carbon atoms, an aryl group having 6 to 10 carbon atoms, or a heteroaryl group having 4 to 10 carbon atoms. $R^6$ and $R^7$ may be bonded to each other to form a ring, and examples of the ring to be formed include an alicycle having 5 to 10 carbon atoms, an aryl ring having 6 to 10 carbon atoms, and a heteroaryl ring having 3 to 10 carbon atoms. A plurality of $R^8$'s and $R^9$'s each independently represent an alkyl group having 1 to 10 carbon atoms, an alkoxy group having 1 to 10 carbon atoms, an aryl group having 6 to 20 carbon atoms, or a heteroaryl group having 3 to 10 carbon atoms.

A plurality of X's each independently represent an oxygen atom, a sulfur atom, —NR—, or CRR'—, and R and R' each independently represent a hydrogen atom, an alkyl group having 1 to 10 carbon atoms, or an aryl group having 6 to 10 carbon atoms.

In Formula (3), $R^{31a}$ and $R^{31b}$ each have the same definition as that for $R^{1a}$ and $R^{1b}$ in Formula (1), and the preferable ranges thereof are the same as described above. It is preferable that $R^{31a}$ and $R^{31b}$ are the same as each other.

$R^{32}$ has the same definition as $R^2$ in Formula (1), and the preferable ranges thereof are the same as described above.

$R^6$ and $R^7$ each have the same definition as that for the substituent represented by $R^2$ and $R^3$, and the preferable ranges thereof are the same as described above. $R^6$ and $R^7$ may be bonded to each other to form a ring, and examples of the ring to be formed include an alicycle having 5 to 10 carbon atoms, an aryl ring having 6 to 10 carbon atoms, and a heteroaryl ring having 3 to 10 carbon atoms, and preferred examples thereof include a benzene ring, a naphthalene ring, and a pyridine ring.

In a case where $R^6$ and $R^7$ are bonded to each other to form a 5-membered nitrogen-containing heterocycle having a substituent, the 5-membered-containing nitrogen heterocycle is used as a boron complex, and the 5-membered nitrogen-containing heterocycle substituted with $R^6$ and $R^7$ is introduced and used as a boron complex in the compound represented by Formula (3), a near-infrared absorbing coloring agent achieving both of high fastness and high invisibility can be realized.

$R^8$ and $R^9$ each have the same definition as that for the substituent represented by $R^2$ and $R^3$ in Formula (1), and the preferable ranges thereof are the same as described above.

In a case where X represents —NR— or —CRR'—, it is preferable that R and R' each independently represent a hydrogen atom, an alkyl group having 1 to 6 carbon atoms, or a phenyl group.

As a preferable combination of $R^{31a}$, $R^{31b}$, $R^{32}$, $R^6$, $R^7$, $R^8$, $R^9$, and X in Formula (3), a combination in which $R^{31a}$ and $R^{31b}$ each independently represent an alkyl group having 1 to 10 carbon atoms, a benzene ring, or a pyridine ring, $R^{32}$ represents a cyano group or an alkoxycarbonyl group, $R^6$ and $R^7$ are bonded to each other to form a benzene ring, a pyridine ring, a pyrazine ring, or a pyrimidine ring, $R^8$ and $R^9$ each independently represent an alkyl group having 1 to 6 carbon atoms, a phenyl group, or a naphthyl group, X represents an oxygen atom, a sulfur atom, —NR—, or —CRR'—, and R and R' each independently represent a hydrogen atom, an alkyl group having 1 to 6 carbon atoms, or a phenyl group is exemplified. As a particularly preferable combination, a combination in which both of $R^{31a}$ and $R^{31b}$ represent an alkyl group having 1 to 10 carbon atoms or a benzene ring, $R^{32}$ represents a cyano group, $R^6$ and $R^7$ are bonded to each other to form a benzene ring or a pyridine ring, $R^8$ and $R^9$ each independently represent an alkyl group having 1 to 6 carbon atoms, a phenyl group, or a naphthyl group, and X represents an oxygen atom or a sulfur atom.

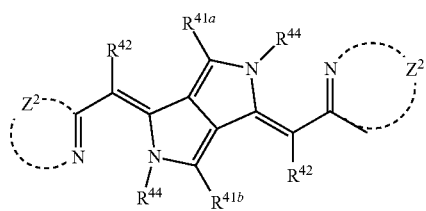

(4)

In Formula (4), $R^{41a}$ and $R^{41b}$ represent different groups and represent an alkyl group having 1 to 20 carbon atoms, an aryl group having 6 to 20 carbon atoms, or a heteroaryl group having 3 to 20 carbon atoms. A plurality of $R^{42}$'s each independently represent a cyano group, an acyl group having 1 to 6 carbon atoms, an alkoxycarbonyl group having 1 to 6 carbon atoms, an alkyl or arylsulfinyl group having 1 to 10 carbon atoms, or a nitrogen-containing heteroaryl group having 3 to 10 carbon atoms. A plurality of $Z^2$'s each independently represent an atomic group that is bonded to —C=N— to form a nitrogen-containing hetero 5- or 6-membered ring, and examples of the nitrogen-containing heterocycle include a pyrazole ring, a thiazole ring, an oxazole ring, an imidazole ring, an oxadiazole ring, a thiadiazole ring, a triazole ring, a pyridine ring, a pyridazine ring, a pyrimidine ring, a pyrazine ring, a benzo-fused ring of these, a naphtho-fused ring of these, or a complex of these fused rings. A plurality of $R^{44}$'s each independently represent a hydrogen atom, an alkyl group having 1 to 20 carbon atoms, an aryl group having 6 to 20 carbon atoms, a heteroaryl group having 4 to 20 carbon atoms, or a metal atom. As a substituent, the plurality of $R^{44}$'s each independently represent a halogen atom or substituted boron containing an alkyl group having 1 to 10 carbon atoms, an aryl group having 6 to 20 carbon atoms, or a heteroaryl group having 4 to 20 carbon atoms. $R^{44}$ may be bonded to the nitrogen-containing heterocycle formed by $Z^2$ through a covalent bond or a coordinate bond. Further, the compounds may further have a substituent.

Formula (2) will be described.

In Formula (2), $Z^{1a}$ and $Z^{1b}$ each independently represent an atomic group that forms an aryl ring or a heteroaryl ring. The aryl ring or the heteroaryl ring to be formed has the same definition as the aryl group or the heteroaryl group described as the substituent of $R^2$ and $R^3$ in Formula (1), and the preferable ranges thereof are the same as described above. It is preferable that $Z^{1a}$ and $Z^{1b}$ are the same as each other.

$R^{5a}$ and $R^{5b}$ each have the same definition as that for $R^2$ and $R^3$ in Formula (1), and the preferable examples thereof are the same as described above. It is preferable that $R^{5a}$ and $R^{5b}$ are the same as each other.

$R^{5a}$ or $R^{5b}$ and $Z^{1a}$ or $Z^{1b}$ may be bonded to each other to form a fused ring, and examples of the fused ring include a naphthyl ring and a quinoline ring.

The invisibility can be greatly improved by introducing the group represented by $R^{5a}$ or $R^{5b}$ to the aryl ring or the heteroaryl ring formed by $Z^{1a}$ or $Z^{1b}$.

A plurality of $R^{22}$'s and $R^{23}$'s each have the same definition as that for $R^2$ and $R^3$ in Formula (1), and the preferable ranges thereof are the same as described above. $R^4$ has the same definition as that for $R^4$ in Formula (1), and the preferable ranges thereof are the same as described above. $R^4$ may be bonded to $R^{23}$ through a covalent bond or a coordinate bond.

The compound represented by Formula (2) may further have a substituent. Further, the substituent which can be introduced has the same definition as the substituent as $R^2$ and $R^3$, and the preferable ranges thereof are the same as described above.

As a preferable combination of $Z^{1a}$, $Z^{1b}$, $R^{5a}$, $R^{22}$, $R^{23}$, and $R^4$ in Formula (2), a combination in which $Z^{1a}$ and $Z^{1b}$ each independently represent a benzene ring or a pyridine ring, $R^{5a}$ and $R^{5b}$ each independently represent an alkyl group, an alkoxy group, a halogen atom, or a cyano group, $R^{22}$ and $R^{23}$ each independently represent a heterocyclic group, a cyano group, an acyl group, an alkoxycarbonyl group, or a cyclic acidic nucleus formed by $R^{22}$ and $R^{23}$ being bonded, $R^4$ represents a hydrogen atom, substituted boron, a transition metal atom, magnesium aluminum, calcium, barium, zinc, or tin is exemplified. As a particularly preferable combination, a combination in which $Z^{1a}$ and $Z^{1b}$ are bonded to each other to form a benzene ring, both of $R^{5a}$ and $R^{5b}$ represent an alkyl group, a halogen atom, or a cyano group, and $R^{22}$ and $R^{23}$ each independently represent a nitrogen-containing heterocyclic group, a cyano group, or an alkoxycarbonyl group; or a combination in which $R^{22}$ and $R^{23}$ are bonded to each other to form a cyclic acidic nucleus, and $R^4$ represents a hydrogen atom, substituted boron, aluminum, zinc, vanadium, iron, copper, palladium, iridium, or platinum is exemplified.

Formula (4) will be described.

In Formula (4), $R^{41a}$ and $R^{41b}$ have the same definition as that for $R^{1a}$ and $R^{1b}$ in Formula (1), and the preferable ranges thereof are the same as described above. $R^{41a}$ and $R^{41b}$ represent different groups.

$R^{42}$ has the same definition as that for $R^2$ in Formula (1), and the preferable ranges thereof are the same as described above.

$Z^2$'s each independently represent an atomic group that is bonded to —C=N— to form a nitrogen-containing hetero 5- or 6-membered ring, and examples of the nitrogen-containing heterocycle include a pyrazole ring, a thiazole ring, an oxazole ring, an imidazole ring, an oxadiazole ring, a thiadiazole ring, a triazole ring, a pyridine ring, a pyridazine ring, a pyrimidine ring, a pyrazine ring, a benzo-fused ring of these, a naphtho-fused ring of these, or a complex of these fused rings.

$R^{44}$'s each independently represent a hydrogen atom, an alkyl group having 1 to 20 carbon atoms, an aryl group having 6 to 20 carbon atoms, a heteroaryl group having 4 to 20 carbon atoms, or a metal atom. As a substituent, the plurality of $R^{44}$'s each independently represent a halogen atom or substituted boron containing an alkyl group having 1 to 10 carbon atoms, an aryl group having 6 to 20 carbon atoms, or a heteroaryl group having 4 to 20 carbon atoms. $R^{44}$ may be bonded to the nitrogen-containing heterocycle formed by $Z^2$ through a covalent bond or a coordinate bond.

In a case where groups represented by $R^{41a}$ and $R^{41b}$ which are different from each other and a nitrogen-containing hetero 5- or 6-membered ring formed by $Z^2$ and —C=N— being bonded to each other are introduced to the compound represented by Formula (4), high fastness, high invisibility, and excellent dispersibility, and high organic solvent solubility can be imparted.

As a preferable combination of $R^{41a}$, $R^{41b}$, $Z^2$, and $R^{44}$ in Formula (4), a combination in which $R^{41a}$ and $R^{41b}$ each independently represent an alkyl group having 1 to 10 carbon atoms, a benzene ring, or a pyridine ring, $R^{42}$ represents a cyano group, an alkyl or arylsulfinyl group having 1 to 10 carbon atoms, or an alkoxycarbonyl group, $Z^2$ is bonded to —C=N— to form a thiazole ring, an oxazole ring, an imidazole ring, a thiadiazole ring, a triazole ring, a pyridine ring, a pyrimidine ring, a pyrazine ring, a benzo-fused ring of these, or a naphtho-fused ring of these, and $R^{44}$ represents a hydrogen atom, substituted boron, a transition metal atom, magnesium aluminum, calcium, barium, zinc, or tin is exemplified.

As a particularly preferable combination, a combination in which $R^{41a}$ and $R^{41b}$ each independently represent an alkyl group or a benzene ring, $R^{42}$ represents a cyano group, $Z^2$ is bonded to —C=N— to form a thiazole ring, an oxazole ring, an imidazole ring, a thiadiazole ring, a pyridine ring, a pyrimidine ring, a benzo-fused ring of these, or a naphtho-fused ring of these, and $R^{44}$ represents a hydrogen atom, substituted boron (examples of the substituent include an alkyl group having 1 to 10 carbon atoms, a benzene ring, a pyridine ring, or a thiophene ring), aluminum, zinc, vanadium, iron, copper, palladium, iridium, or platinum is exemplified.

The compound represented by Formula (1), the compound represented by Formula (2), the compound represented by Formula (3), and the compound represented by Formula (4) which are used as near infrared absorbing coloring agents in the resin composition according to the embodiment of the present disclosure are described in detail in JP2009-263614A, and the compounds described in JP2009-263614A are used as the near infrared absorbing coloring agents in the present disclosure. Further, specific examples of the compound represented by Formula (1) and the compound represented by Formula (3) which is a preferable aspect of the compound represented by Formula (1) include the compounds described in JP2009-263614A, which are the compounds having the structurers shown below. However, the specific examples of the compound represented by Formula (1) are not limited thereto.

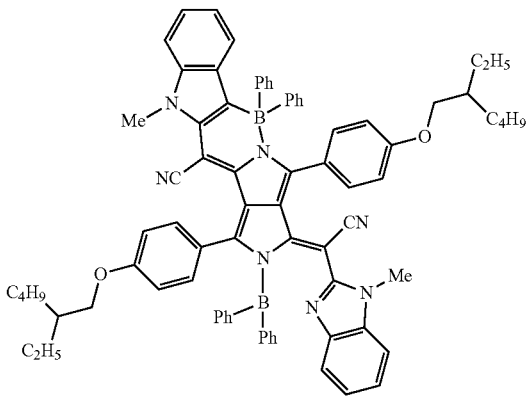

A-1

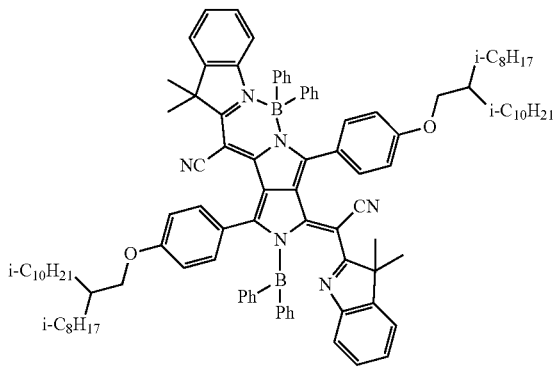

A-2

-continued
A-3
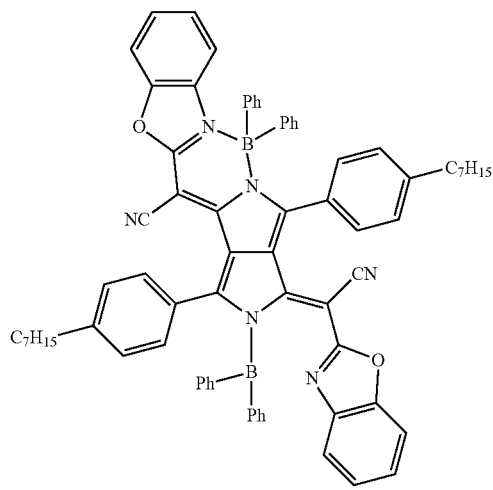
A-4
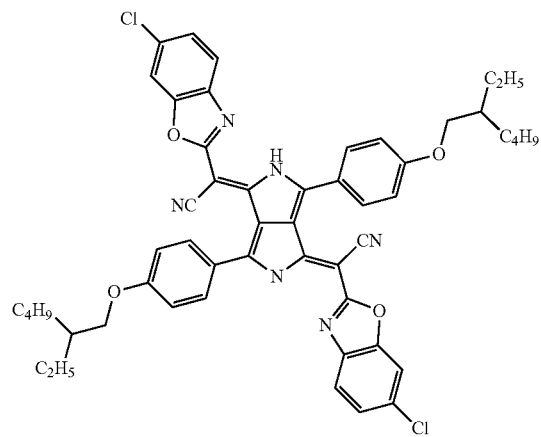
A-5
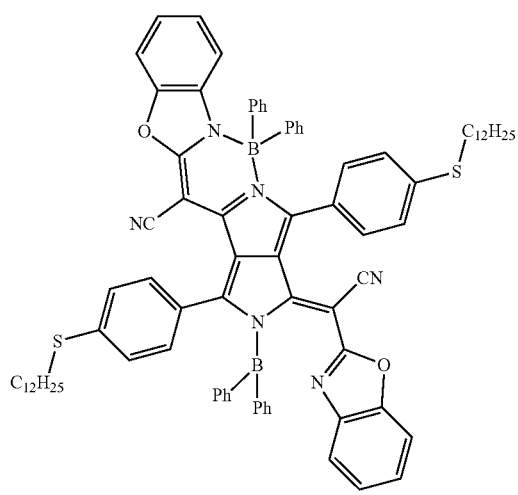
A-6
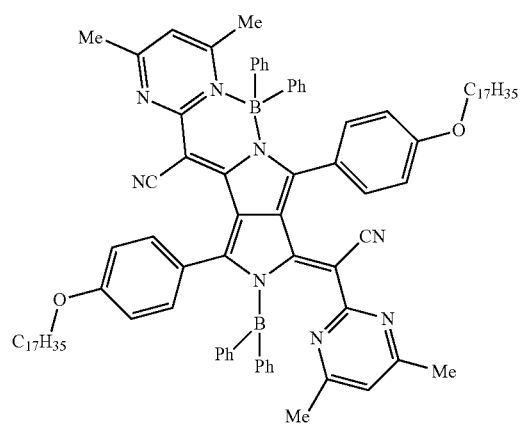
A-7
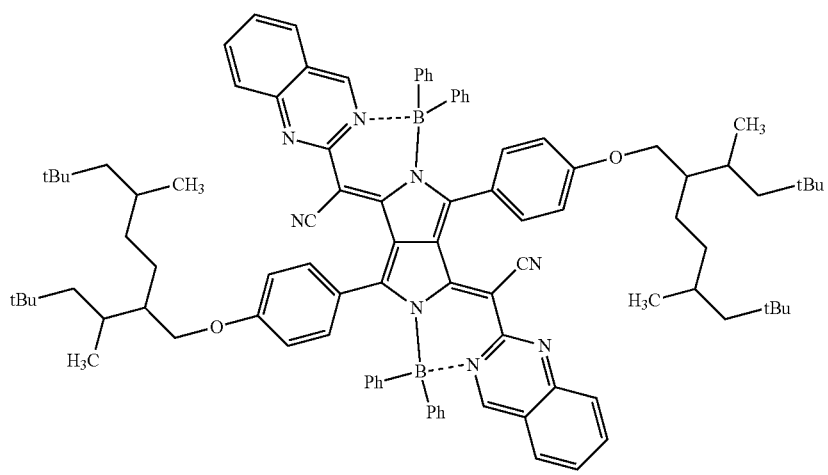

-continued
A-8
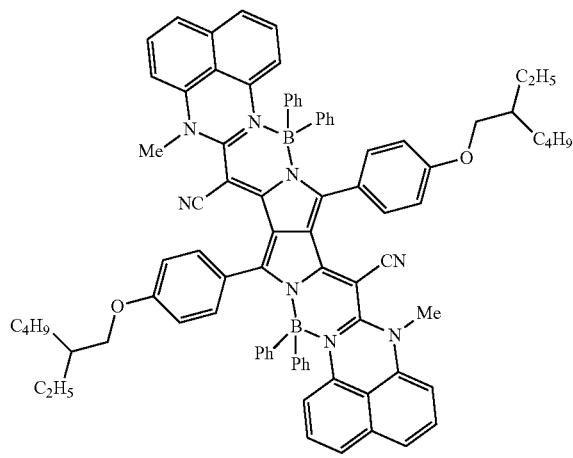
A-9
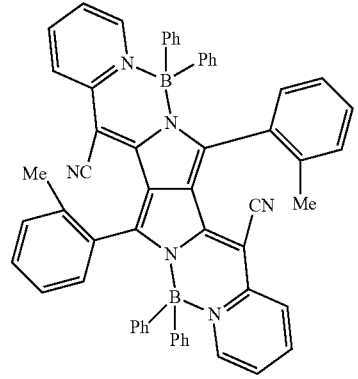
A-10
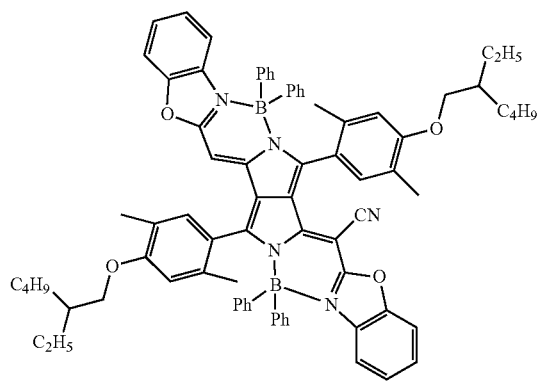
A-11
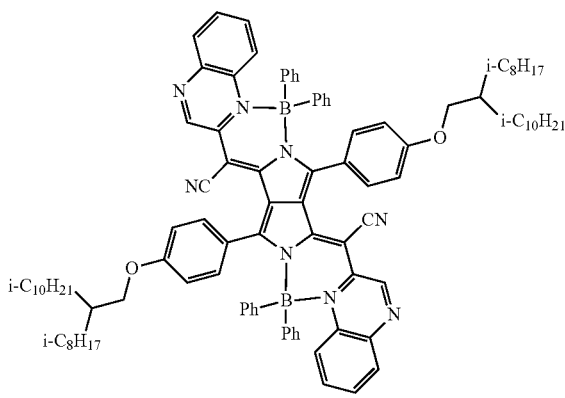
A-12
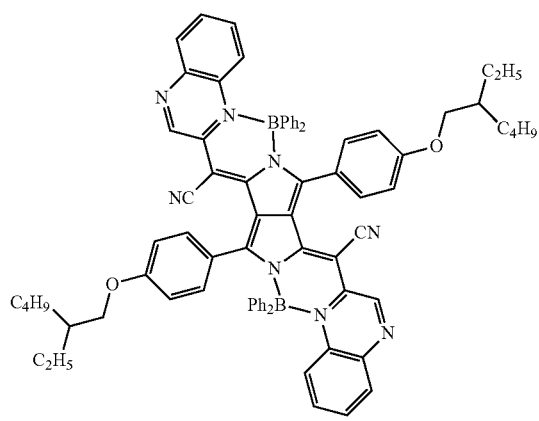
A-13
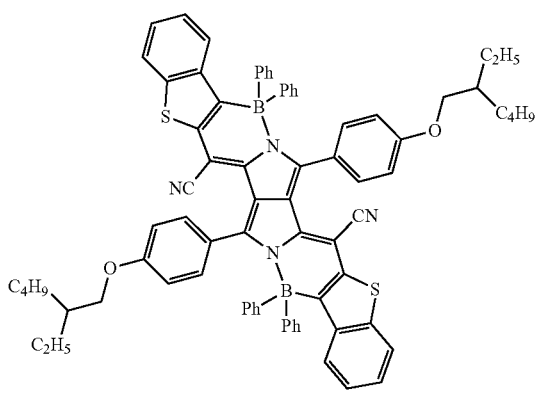

-continued
A-14
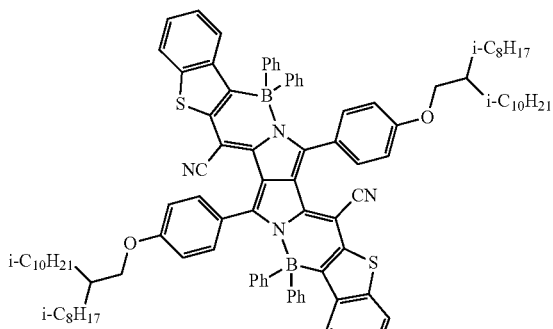
A-15
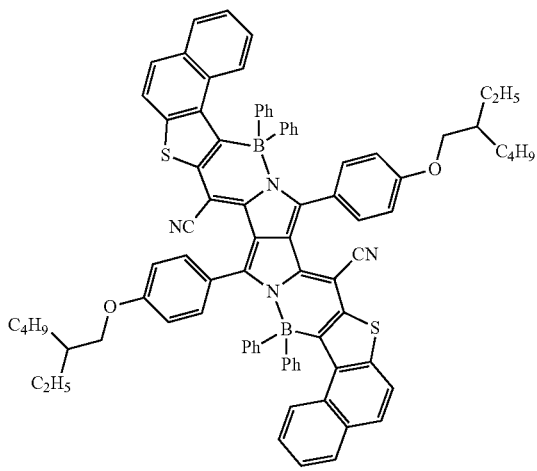
A-16
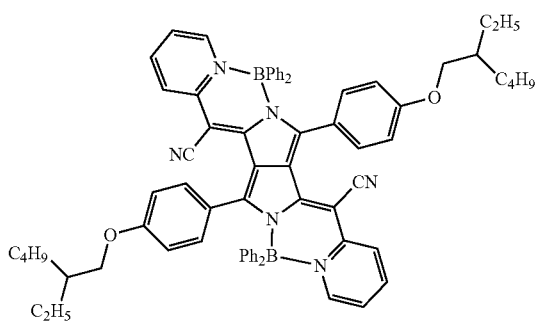
A-17
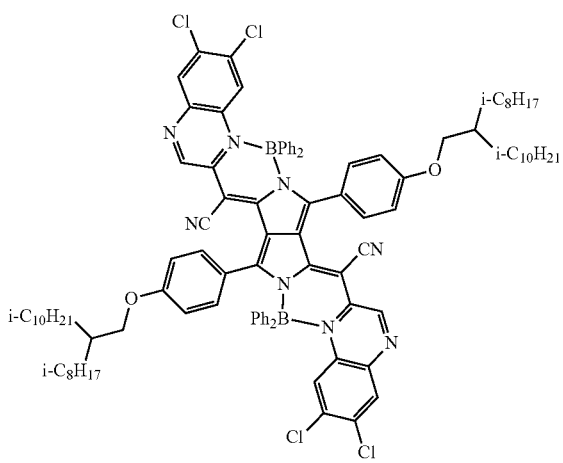
A-18
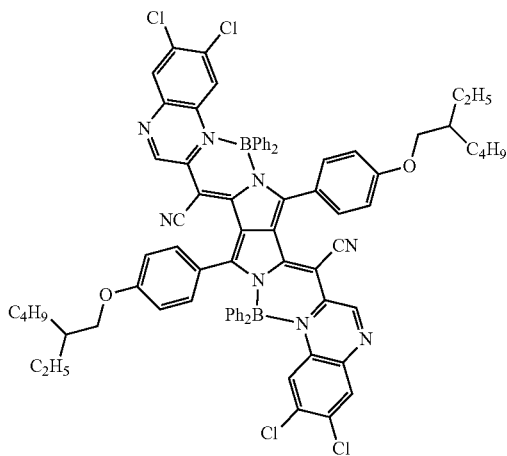
A-19
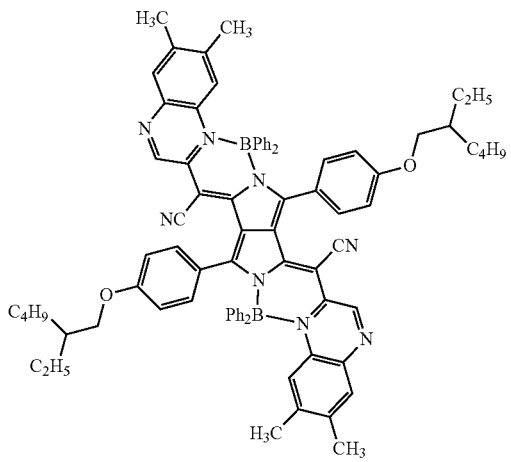

-continued
A-20
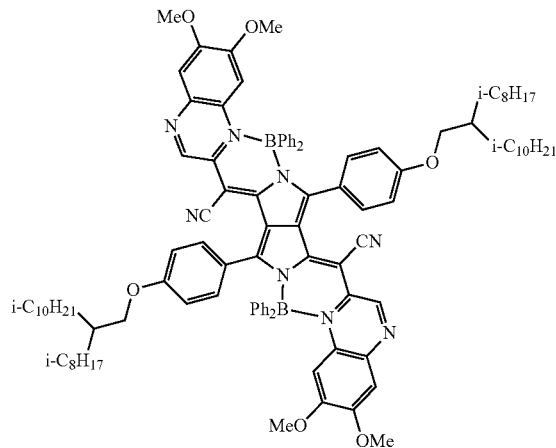
A-21
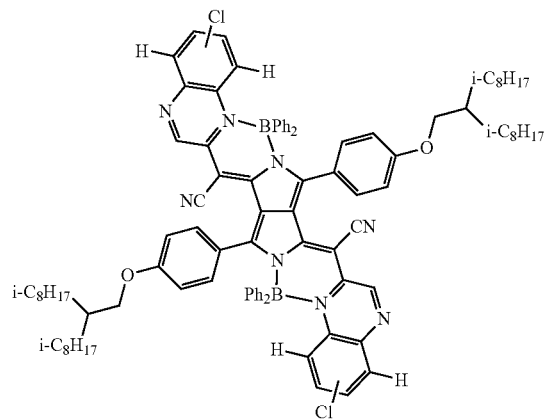
A-22
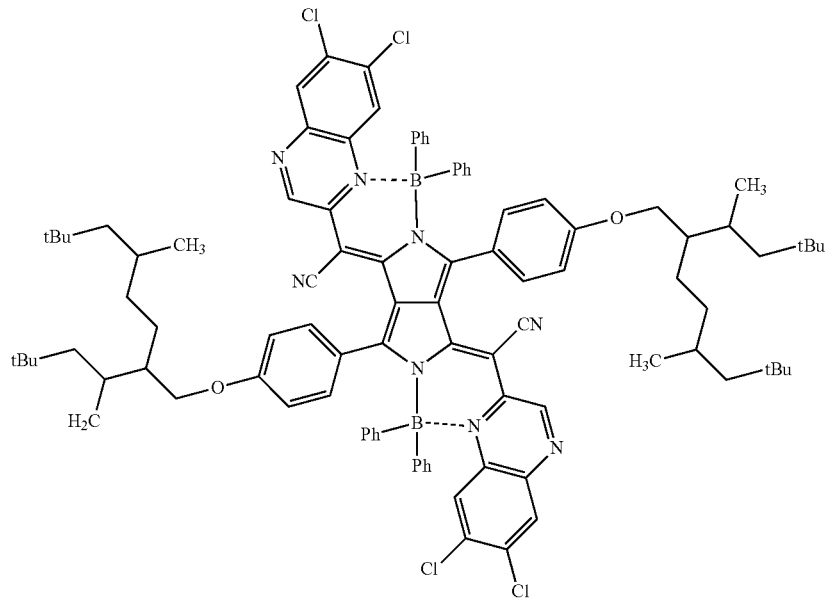

-continued
A-23
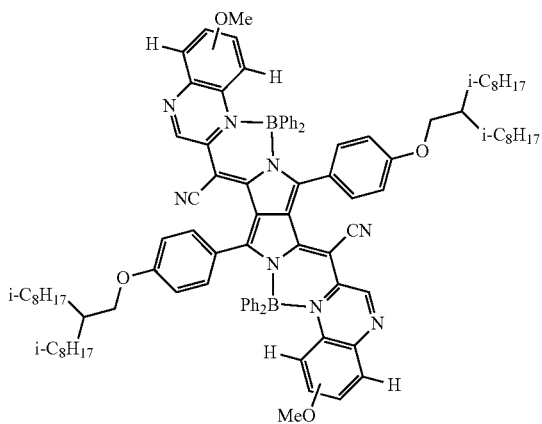
A-24
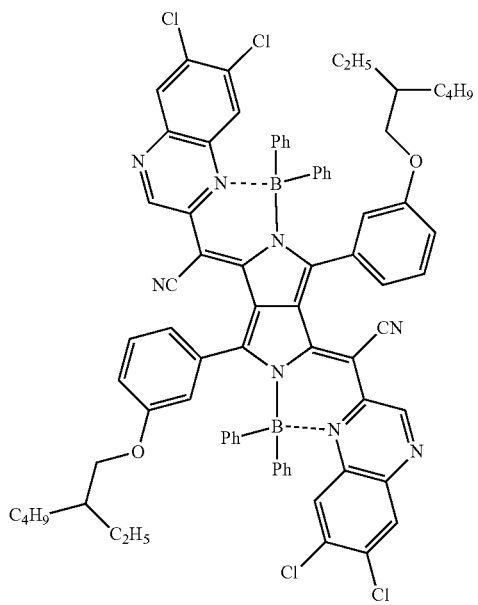
A-25
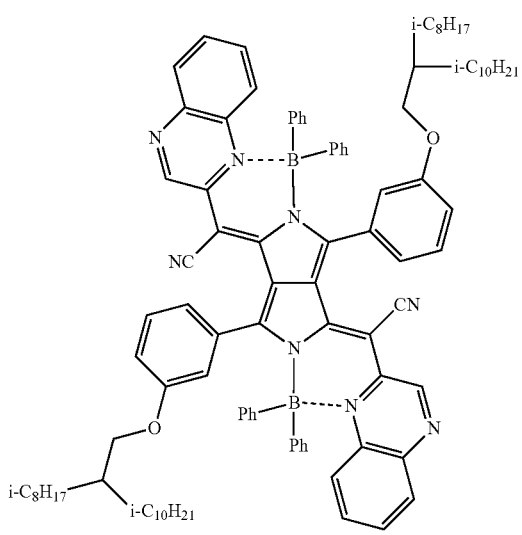
A-26
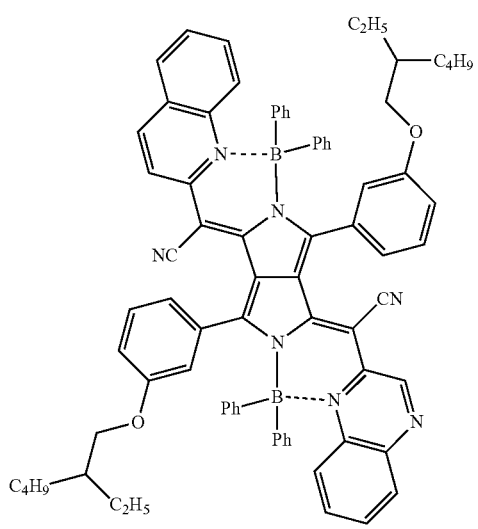
A-27
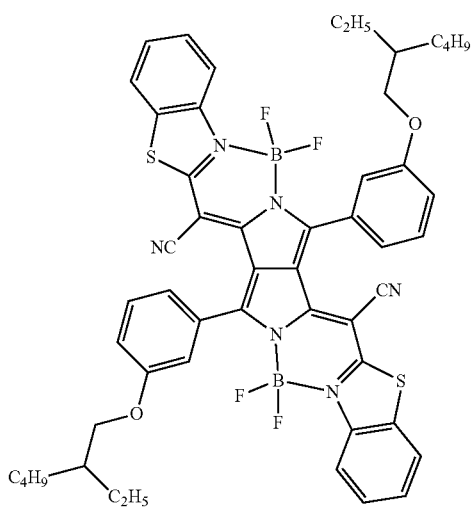
A-28
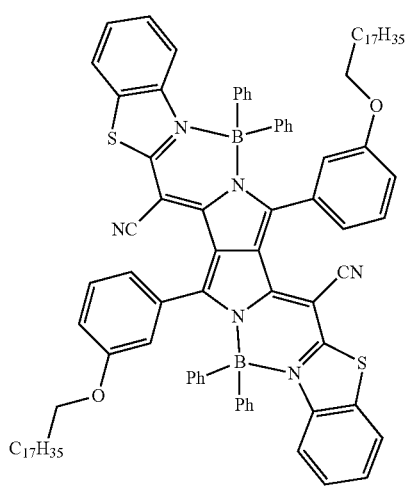

-continued

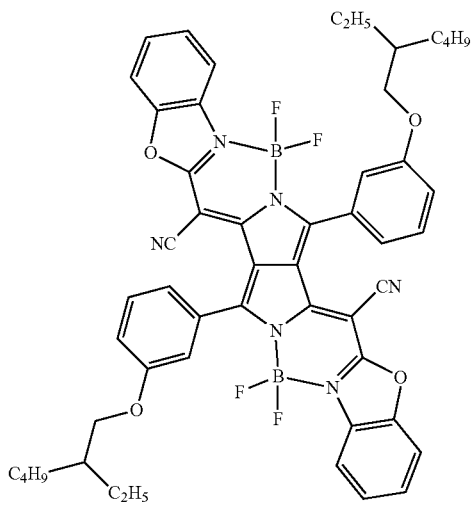

A-29

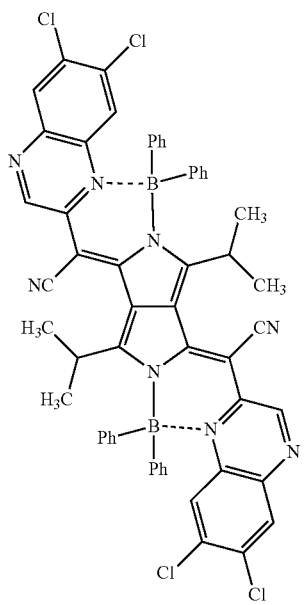

A-30

[Resin]

The resin composition according to the embodiment of the present disclosure contains a resin.

The resin which can be contained in the resin composition is not particularly limited as long as the resin composition containing the specific infrared absorbing coloring agent described above can be prepared using the resin. Examples of the resin in the present disclosure include typical synthetic resins. Among examples of the resins, from the viewpoint of easily performing molding, a thermoplastic resin is preferable.

Examples of the thermoplastic resin include polyester, polystyrene, polyamide, polyurethane, polycarbonate, cellulose acetate, polyacryl, polyacetal, polypropylene, polyvinyl, polysulfone, polyimide, and polyolefin.

The resin contained in the resin composition can be used without limitation as long as the resin is appropriately selected depending on the applications of the resin composition and has desired characteristics such as strength and transparency suitable for the applications of the resin composition.

Among the examples of the resin, from the viewpoint of the processability, the versatility, the durability, and the cost, it is preferable that the resin composition contains at least one selected from polyester, polyurethane, polyamide, polyolefin, polystyrene, or polycarbonate and more preferable that the resin composition contains at least one selected from polyester, polyamide, and polyurethane.

As the polyester, polyethylene terephthalate (PET) obtained by polycondensation of dimethyl terephthalate or terephthalic acid and ethylene glycol or polybutylene terephthalate (PBT) obtained by polycondensation of dimethyl terephthalate and butanediol is preferable. Particularly from the viewpoints of the production stability and the production cost, polyethylene terephthalate is more preferable.

Further, as the polyester, polylactic acid which is a biodegradable resin having excellent environmental suitability may be selected and used.

Examples of the polyester include typical poly-L-lactic acid and poly-D-lactic acid, and a stereo complex or the like obtained by mixing poly-L-lactic acid and poly-D-lactic acid is also useful for the resin composition according to the embodiment of the present disclosure.

As the polyester, a commercially available product may be used.

Examples of the commercially available product of the polyester include "MITSUI PET (trade name)" Series (such as product number: MITSUI J125) (manufactured by Mitsui Chemicals, Inc.), and "VYLON" Series (manufactured by Toyobo Co., Ltd.)

Examples of the polyester selected from copolymer resins including a polylactic acid resin and polylactic acid include a crystalline polylactic acid resin ("REVODE (registered trademark)" Series, manufactured by Zhejiang Hisun Biomaterials Co., Ltd., ratio of L body/D body=100/0 to 85/5, for example, product number: REVODE 101) and "LACEA (registered trademark)" Series (manufactured by Mitsui Chemicals, Inc.) produced by performing lactic acid fermentation on plat starch which is a polylactic acid resin.

As the polyamide, nylon (registered trademark) 66 obtained by using hexamethylenediamine and adipic acid or nylon 6 obtained by performing ring-opening polymerization on ε-caprolactam is preferable. From the viewpoint of the cost, nylon 6 is preferable.

As the polyamide, a commercially available product may be used.

Examples of the commercially available product of the polyamide include nylon 6 and "AMILAN (registered trademark)" Series (for example, product number; CM1017) which is nylon 66 (all manufactured by Toray Industries, Inc.); "LEONA (registered trademark)" Series which is a polyamide 66 resin (manufactured by Asahi Kasei Corporation); and "n-nylon" or "n,m-nylon" Series (manufactured by Teijin Limited).

The polyurethane is a copolymer obtained by reacting isocyanate with polyol.

As the isocyanate component, aromatic diisocyanate, aliphatic diisocyanate, alicyclic diisocyanate, or a mixture of these, for example, tolylene 2,4-diisocyanate, 4,4'-diphenylmethane diisocyanate, 1,6-hexane diisocyanate, or 1,4-cyclohexane diisocyanate can be used as a main component. Further, tri- or higher functional polyisocyanate may be combined with the isocyanate component serving as the main component, as necessary.

As the polyol component, polyether polyol or polyester polyol may be used. As the polyether polyol, polyethylene glycol, polypropylene glycol, or polytetramethylene glycol can be used. As the polyester polyol, a reaction product of a diol such as ethylene glycol or propylene glycol and dihydrochloric acid such as adipic acid or sebacic acid; or a ring-opening polymer such as caprolactone can be used.

The polyolefin is a resin using a homopolymer such as ethylene, propylene, butane, or pentene or a copolymer of these as a main component.

Examples of the polyolefin include polyethylene, polypropylene, an ethylene-vinyl acetate copolymer, an ethylene-methyl acrylate copolymer, an ethylene-methyl methacrylate copolymer, an ethylene-ethyl acrylate copolymer, a propylene-vinyl acetate copolymer, a propylene-methyl acrylate copolymer, a propylene-methyl methacrylate copolymer, a propylene-ethyl acrylate copolymer, polybutene, a poly-3-methyl-1-butene copolymer, and a poly-4-methyl-1-pentene copolymer.

Among the examples of the polyolefin, polypropylene and polyethylene, which are inexpensive, have excellent processability, and are widely used for various industrial components and home appliances, are preferable.

As the polyolefin, a commercially available product may be used. Examples of the commercially available product of a polyolefin-based resin containing the polyolefin include each series of polypropylene-based resins "PRIME POLYPRO", "POLYFINE", and "PRIME TPO" (for example, product number: J-700GP and J-966HP) (all manufactured by Prime Polymer Co., Ltd.); each series of various polyethylene resins "HI-ZEX", "NEO-ZEX", ULTZEX", "MORETEC", and "EVOLUE" (for example, a high-density polyethylene resin, product number: 2200J) (all manufactured by Prime Polymer Co., Ltd.); and low-density polyethylene "PETROTHENE" Series (for example, product number: PETROTHENE 190) (all manufactured by Tosoh Corporation).

The polycarbonate is a resin typically produced by reacting dihydric phenol with a carbonate precursor. Examples of the dihydric phenol include 2,2-bis(4-hydroxyphenyl)propane (hereinafter, also referred to as bisphenol A), tetramethyl bisphenol A, tetrabromo bisphenol A, bis(4-hydroxyphenyl)p-isopropylbenzene, hydroquinone, resorcinol, 4,4'-dihydroxyphenol, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)ketone, 1,1-bis(4-hydroxyphenyl)ethane, and 1,1-bis(4-hydroxyphenyl)cyclohexane. Examples of the carbonate precursor include phosgene; diaryl carbonate such as diphenyl carbonate, and diahaloformate such as haloformate or dihaloformate of dihydric phenol.

Examples of a commercially available aromatic polycarbonate resin which can be used as polycarbonate in the resin composition according to the embodiment of the present disclosure include "TARFLON" Series (manufactured by Idemitsu Kosan Co., Ltd.) and "PANLITE" Series (manufactured by Teijin Limited).

Examples of the polystyrene-based resin include polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene, and copolymers having these structural units.

These polystyrene-based resins may be used alone or in combination of two or more kinds thereof.

Examples of commercially available products of the polystyrene-based resin include "PSJ-POLYSTYRENE" Series (for example, product number: H8672) (manufactured by PS Japan Corporation) and "TOYO STYROL" Series (manufactured by Toyo-Styrene Co., Ltd.).

As the resin, a commercially available resin can be used or a resin formed by using a precursor monomer of a commercially available resin can also be used.

Further, the resin composition may contain only one or two or more kinds of resins. Here, in a case where the resin composition contains two or more kinds of resins, from the viewpoints of the compatibility and the moldability, it is preferable that the resin composition contains resins whose glass transition temperatures and SP values are close to each other.

[Method of Preparing Resin Composition]

A method of preparing the resin composition according to the embodiment of the present disclosure is not particularly limited. For example, a resin composition may be obtained by directly kneading a specific infrared absorbing coloring agent into a master batch or a resin pellet serving as a resin raw material in order to allow the resin composition to contain a specific near infrared absorbing coloring agent, mixing the resultant, and performing melt molding thereon. Alternatively, the resin composition may be obtained by adhering a specific infrared absorbing coloring agent to the resin according to a method of performing coating or immersion.

From the viewpoint that the specific infrared absorbing coloring agent is unlikely to be desorbed from the surface of the resin and the durability and the durability and persistence of the infrared absorption capacity are excellent, the resin composition obtained by directly kneading the specific near infrared absorbing coloring agent into the resin, performing kneading, and performing melt molding is preferable.

It is preferable that a molded article is formed after the specific infrared absorbing coloring agent is mixed with the resin and uniformly dispersed at the stage of forming the resin molded article. Further, the specific infrared absorbing coloring agent is mixed with the resin according to a method of heating and kneading the resin and the specific infrared absorbing coloring agent or a method of stirring and mixing the resin, the specific infrared absorbing coloring agent, and a solvent.

The content of the specific infrared absorbing coloring agent in the resin composition is in a range of 0.3% by mass to 5% by mass and preferably in a range of 0.4% by mass to 4.5% by mass with respect to the total mass of the resin composition.

In a case where the content of the specific infrared absorbing coloring agent in the resin composition is 5% by mass or less, occurrence of cracks in a molded article at the time of forming a resin molded article using the resin composition or occurrence of disconnection at the time of forming a linear molded article is suppressed. Further, in a case where the content of the specific infrared absorbing coloring agent is 0.3% by mass or greater, the specific infrared absorbing coloring agent can exhibit desired infrared absorption capacity.

(Other Components)

The resin composition according to the embodiment of the present disclosure may contain various additives in addition to the resin and the specific infrared absorbing coloring agent as long as the effects of the present disclosure are not impaired.

(Colorant)

The resin composition according to the embodiment of the present disclosure may contain a colorant.

In a case where the resin composition contains a colorant, a desired hue can be imparted to the resin composition according to the embodiment of the present disclosure and the resin molded article prepared from the resin composition.

Examples of the colorant include dye compounds, pigment compounds, and dispersions thereof. The colorant may be an inorganic compound or an organic compound.

A pigment may be used as the colorant.

The pigment which can be used as the colorant will be described.

Examples of black pigments include organic black pigments such as aniline black, anthraquinone black, and perylene black; and inorganic black pigments such as carbon black, lamp black, graphite, fullerene, carbon nanotubes, magnetite, iron-titanium complex oxides, cobalt oxide, manganese dioxide, zinc sulfide, copper-chromium complex oxides, tin-antimony complex oxides, titanium-vanadium-antimony complex oxides, cobalt-nickel complex oxides, manganese-iron complex oxides, iron-cobalt-chromium complex oxides, copper-chromium complex oxides, iron-cobalt complex oxides, chromium-iron-nickel complex oxides, molybdenum disulfide, lower titanium oxide, titanium nitride, and chromium oxide.

A chromatic pigment indicates a colored pigment with a hue other than black, and a red pigment, a yellow pigment, an orange pigment, a purple pigment, a blue pigment, a green pigment, and a brown pigment are preferable.

Examples of the red pigment include a naphthol-based pigment, an azo-based pigment, a quinacridone-based pigment, an anthraquinone-based pigment, a perylene-based pigment, and a diketopyrrolopyrrole pigment.

Examples of the yellow pigment include an organic pigment such as an azo-based pigment, an anthraquinone-based pigment, an isoindolinone-based pigment, a quinophthalone-based pigment, or a benzimidazolone-based pigment; and an inorganic pigment such as a titanium-nickel-antimony composite oxide or a zinc-iron composite oxide.

Examples of the orange pigment include a naphthol-based pigment, an azo-based pigment, a benzimidazolone-based pigment, a quinacridone-based pigment, and a diketopyrrolopyrrole-based pigment.

Examples of the purple pigment include an azo-based pigment, a rhodamine-based pigment, a carbazole-based pigment, a perylene-based pigment, and a quinacridone-based pigment.

Examples of the blue pigment include an organic pigment such as a phthalocyanine-based pigment; and an inorganic pigment such as a cobalt-aluminum composite oxide, a cobalt-aluminum-chromium composite oxide, or ultramarine blue.

Examples of the green pigment include an organic pigment such as a phthalocyanine-based pigment or an azo-based pigment; and an inorganic pigment such as a chromium oxide, a cobalt-chromium-aluminum composite oxide, or a cobalt-nickel-zinc composite oxide.

Examples of the brown pigment include an organic pigment such as an azo-based pigment or a benzimidazolone-based pigment; and an inorganic pigment such as an iron oxide or a titanium-chromium-antimony composite oxide.

The average primary particle diameter of the pigment used in the resin composition is preferably in a range of 0.01 μm to 5 μm and more preferably in a range of 0.01 μm to 3 μm.

The average primary particle diameter of the pigment is an arithmetic mean value of an equivalent circle diameter which is in acquired in conformity with JIS Z8901-2006 "Test Powder and Test Particles" 5.4.4. particle size distribution (c) microscopy and is calculated by observing particles (20 to 50 particles) of an image obtained by observing a sample prepared according to a shaking method at a magnification of 50000 to 1000000 using a transmission electron microscope (manufactured by JEOL Ltd.).

A dye may be used as the colorant.

The dye which can be used as the colorant will be described.

Preferred examples of the dye include an acid dye, a direct dye, a basic dye, a salt-forming dye, an oil-soluble dye, a disperse dye, a reactive dye, a mordant dye, a vat dye, and a sulfur dye.

Examples of the acid dye include an anthraquinone-based acid dye, a phthalocyanine-based acid dye, a quinoline-based acid dye, an azine-based acid dye, an indigoid-based acid dye, a xanthene-based acid dye, and a triphenylmethane-based acid dye.

Examples of the direct dye include an azo-based direct dye, a thiazole-based direct dye, an anthraquinone-based direct dye, an oxazine-based direct dye, and a phthalocyanine-based direct dye.

Examples of the basic dye include an azo-based basic dye, an azine-based basic dye, an acridine-based basic dye, a methane-based basic dye, a thiazole-based basic dye, a thiazine-based basic dye, an oxazine-based basic dye, an anthraquinone-based basic dye, a xanthene-based basic dye, and a triarylmethane-based basic dye.

Examples of the oil-soluble dye include an anthraquinone-based oil-soluble dye, a phthalocyanine-based oil-soluble dye, a quinoline-based oil-soluble dye, an azine-based oil-soluble dye, an indigoid-based oil-soluble dye, a methine-based oil-soluble dye, an azo-based oil-soluble dye, an aminoketone-based oil-soluble dye, a xanthene-based oil-soluble dye, and a triphenylmethane-based oil-soluble dye.

Examples of the disperse dye include an anthraquinone-based disperse dye, a quinoline-based disperse dye, an indigoid-based disperse dye, a quinophthalone-based disperse dye, a methine-based disperse dye, an azo-based disperse dye, an aminoketone-based disperse dye, and a xanthene-based disperse dye.

Further, a salt-forming dye such as a salt-forming body of the acidic dye and a cationic compound; a salt-forming body of the basic dye and an anionic compound, or a salt-forming body of the acidic dye and the basic dye can be used.

In a case where the resin composition contains a colorant, the resin composition may contain only one or two or more kinds of colorants.

The content of the colorant in the case of being contained in the resin composition is preferably in a range of 0.0001% by mass to 20% by mass and more preferably in a range of 0.001% by mass to 10% by mass.

(Inorganic Filling Material)

An organic filling material can be further blended into the resin composition for the purpose of improving any of impact resistance, an antibacterial property, a gas barrier property, conductivity, a magnetic property, a piezoelectric property, a vibration-damping property, a sound insulation property, a sliding property, an electromagnetic wave absorbing property, flame retardancy, a dehydrating property, a deodorizing property, an anti-blocking property, an oil absorption property, a water absorption property, or moldability as necessary.

Examples of the inorganic filling material include carbon fibers, glass fibers, glass flakes, zeolite, mica, graphite, metal powder, ferrite, alumina, barium titanate, potassium titanate, barium sulfate, TEFLON (registered trademark) powder, talc, charcoal powder, carbon nanotubes (CNT), carbon micro-coil (CMC), antimony oxide, aluminum hydroxide, magnesium hydroxide, hydrotalcite, calcium oxide, silica, and calcium carbonate. It is preferable that the inorganic filling material is blended in an amount that does not degrade the transparency of the resin molded article.

Further, any known additives can be selected from a leveling agent, a pigment dispersant, an ultraviolet absorbing agent, an antioxidant, a viscosity modifier, a light stabilizer, a heat-resistance stabilizer, a metal deactivator, a peroxide decomposer, a processing stabilizer, a nucleating agent, a crystallization accelerator, a crystallization retarder, an antigelling agent, a filler, a reinforcing agent, a plasticizer, a lubricant, a flame retardant, a rust inhibitor, a fluorescent brightener, a fluidity modifier, and an antistatic agent and then can be blended into the resin composition according to the embodiment of the present disclosure.

[Resin Molded Article]

A resin molded article according to the embodiment of the present disclosure is a resin molded article serving as a cured product of a resin composition, which is prepared by using the resin composition including at least one near infrared absorbing coloring agent selected from compounds represented by Formula (1), and a resin, in which the content of the near infrared absorbing coloring agent is in a range of 0.3% by mass to 5% by mass with respect to the total amount of the resin composition.

The shape and the applications of the resin molded article are not particularly limited and the form thereof can be the same as a typical resin molded article.

The resin composition according to the embodiment of the present disclosure can be processed to various resin molded articles.

Specific examples of the forms of the resin molded articles include the forms of resin molded articles used for various applications, for example, resin films; synthetic fibers, resin containers such as bottles, containers for cosmetics, and containers for food; resin plates; lenses; toners; various home appliances including typical accessories and exterior components such as electronic devices; house construction material components such as interior materials and exterior materials; and interior and exterior components such as aircrafts and vehicles.

Further, examples of the resin molded articles include resin pellets or granular resins which can be used as the raw materials of various resin molded articles described above.

Among the examples of the resin molded articles, in a case where the resin molded article according to the embodiment of the present disclosure is used for resin films or synthetic fibers, infrared-absorbing resin films or infrared-absorbing synthetic fibers are obtained and the effects thereof are significant because the infrared absorption capacity is maintained for a long time without changing the tint of the resin so that the resin molded article which has been heated and molded maintains excellent infrared absorption capacity.

Further, the resin molded article according to the embodiment of the present disclosure can be suitably applied to resin pellets or resin particles serving as resin raw materials provided for heating and molding.

A method of producing the resin molded article is not particularly limited, and a known method of molding a resin can be appropriately employed.

For example, a production method of mixing a predetermined content of the compound represented by Formula (1) serving as a specific infrared absorbing coloring agent with a predetermined content of a resin chip, adding other optional components as necessary, mixing or melt kneading the mixture to obtain a resin composition, and molding the obtained resin composition using an optional method is exemplified.

Among examples of the production method, it is preferable to employ the following method of producing a resin molded article.

[Method of Producing Resin Molded Article]

A method of producing the resin molded article according to the embodiment of the present disclosure includes a step of kneading at least one near-infrared absorbing coloring agent selected from the above-described compounds represented by Formula (1) and a resin to obtain a resin kneaded material; and a step of molding the obtained resin kneaded material.

(Step of Kneading at Least One Near-Infrared Absorbing Coloring Agent Selected from Compounds Represented by Formula (1) and Resin to Obtain Resin Kneaded Material)

A resin kneaded material can be obtained by mixing a predetermined content of the compound represented by Formula (1) serving as a specific infrared absorbing coloring agent with a predetermined content of a resin chip (a chip of a resin selected from nylon 6, polyester, and the like), adding other optional components as necessary, and performing melt kneading.

The obtained resin kneaded material may be prepared to have a pellet shape, a powder shape, a granular shape, or a bead shape to obtain a solid-state resin composition containing a specific infrared absorbing coloring agent and a resin.

The kneading can be carried out using a known device such as a Banbury mixer, a twin screw extruder, a single screw extrude, a rotor type twin screw kneader, or a kneader.

(Step of Molding Obtained Resin Kneaded Material)

The obtained solid-state resin composition is melted and then melt-kneaded to obtain a resin kneaded material using a melt extruder, the obtained resin kneaded material is allowed to pass through a gear pump or a filter from the melt extruder, and various molded articles can be produced as desired.

Further, the specific infrared absorbing coloring agent and the resin chip are added to the melt extruder, the mixture is melted to prepare a resin kneaded material, and molding is continuously carried out so that a molten resin kneaded material is molded without forming a solid-state resin composition.

For example, in a case where a resin film is formed as a resin molded article, an unstretched resin film can be obtained by extruding a melt kneaded material to a cooling roll through a die and cooling and solidifying the kneaded material.

Examples of the film molding which can be used for forming a resin film include T-die film molding, inflation molding, and calendar molding.

Further, synthetic fibers can be obtained by extruding the melt kneaded material in the form of fibers from a nozzle (spinneret) with a plurality of thin holes to be spun after the melt kneaded material is allowed to pass through the gear pump or filter from the melt extruder.

(Other Production Methods)

As the molding method for obtaining the resin molded article using a solid-state resin composition as a raw material, various molding methods such as injection molding, vacuum molding, extrusion molding, blow molding (such as biaxial stretch blow molding or direct blow molding), and rotational molding can be employed in addition to the film formation and the spinning of a synthetic resin described above.

Among the examples of the molding method, molding methods such as injection molding, film molding, and blow molding are preferable as the molding method which can be employed for producing the resin molded article.

In a case where the resin composition is applied to the molding method without forming a resin kneaded material, the resin composition can be mixed using a known mixer such as a Henschel mixer, a tumbler, a disper, a kneader, a roll mill, a super mixer, a vertical granulator, a high speed mixer, a far matrix, a ball mill, a steel mill, a sand mill, a vibration mill, or an attritor.

The resin molded article containing the specific infrared absorbing coloring agent and the resin which has been obtained in the above-described manner is expected to be applied to authenticity determination using the characteristic of showing absorption in an invisible infrared region. In addition, the resin molded article is considered to be applied to yarns or fibers having a high heat-storing effect and a high temperature-retaining effect using the photothermal conversion property of the near infrared absorbing coloring agent.

Further, since the specific infrared absorbing coloring agent contained in the resin composition according to the embodiment of the present disclosure has excellent invisibility, the transparency of the original resin of the obtained resin molded article is not impaired. In a case where the resin composition further contains a colorant, a molded article with excellent designability, a molded article with an excellent tint, synthetic fibers, and the like can be obtained without impairing the tint of the colorant.

EXAMPLES

Hereinafter, the resin composition according to the embodiment of the present disclosure and a printing object will be described in more detail based on examples, but the present disclosure is not limited to these examples.

Hereinafter, raw materials used in the examples will be described.

[Colorant]
(Pigment)
(C-1): black inorganic pigment (carbon black C. I. Pigment Black 7, average primary particle diameter: 0.024 μm)
(C-2): blue organic pigment (β type phthalocyanine blue C. I. Pigment Blue 15:3, average primary particle diameter: 0.1 μm)
(C-3): red organic pigment (quinacridone-based red C. I. Pigment Red 122, average primary particle diameter: 0.12 μm)
(C-4): yellow organic pigment (disazo-based yellow C. I. Pigment Yellow 180, average primary particle diameter: 0.23 μm)
(C-5): blue inorganic pigment (ultramarine blue C. I. Pigment Blue 29, average primary particle diameter: 2 μm)
(C-6): golden pearl pigment (particle diameter of 5 μm to 25 μm, titanium oxide coating amount of 48%)
[Specific Infrared Absorbing Coloring Agent]
The specific infrared absorbing coloring agent was selected from the exemplary compounds described in the section of the compound (1) above and then displayed using compound numbers.

[Comparative Infrared Absorbing Coloring Agent]
(D-1): Kayasorb (registered trademark) IRG-023 (diimmonium-based coloring agent, manufactured by Nippon Kayaku Co., Ltd.)
(D-2): FDN-004 (phthalocyanine, manufactured by Yamada Chemical Co., Ltd.)

Example 1

A polyester chip having an intrinsic viscosity of 0.78 dl/g and the above-described specific infrared absorbing coloring agent (A-4) were put into a twin-screw kneader having diameter of 50 mm such that the content of the polyester chip and the content of the specific infrared absorbing coloring agent were set to the values listed in Table 1, and the mixture was melt-kneaded at 280° C. and extruded.

The extruded melt was allowed to pass through a gear pump and a filter (pore diameter of 20 μm) and extruded to a cooling roll at 20° C. from a die to obtain an unstretched film (also referred to as an amorphous film). Further, the extruded melt was brought into close contact with the cooling roll using an electrostatic application method and cooled to form an unstretched film.

Next, the unstretched film extruded and solidified on the cooling roll was sequentially and biaxially stretched, thereby obtaining a polyester film having a thickness of 200 μm as a resin molded article.

<Stretching Method>
(a) Longitudinal Stretching
The unstretched film was stretched in the longitudinal direction (transport direction) by allowing the film to pass through a space between two pairs of nip rolls with different peripheral speeds. Further, the film was stretched by setting the preheating temperature to 90° C., the stretching temperature to 90° C., the stretching rate to 3.5 times, and the stretching speed to 3000%/sec.
(b) Horizontal Stretching
The longitudinally stretched film was horizontally stretched under the following conditions using a tenter.
<Conditions>
Preheating temperature: 100° C.
Stretching temperature: 110° C.
Stretching rate: 4.2 times
Stretching speed: 70%/sec
—Heat Fixation and Heat Relaxation—
Next, the stretched film after the longitudinal stretching and the horizontal stretching was heat-fixed under the following conditions. Further, after the heat fixation, the film was heat-relaxed by reducing the tenter width under the following conditions.
<Heat Fixation Conditions>
Heat fixation temperature: 198° C.
Heat fixation time: 2 seconds
<Heat Relaxation Conditions>
Heat relaxation temperature: 195° C.
Heat relaxation rate: 5%

Examples 2 to 9 and Comparative Examples 1 to 6

The kind of the specific infrared absorbing coloring agent, the content thereof, and the resin used therein in Example 1 were changed as listed in Table 1. Further, each film was prepared in the same manner as in Example 1 except that a colorant as an additive was added as desired.

Example 10

A nylon 6 chip having an intrinsic viscosity of 3.05 dl/g as a polyamide resin, a specific infrared absorbing coloring agent A-13, and a specific infrared absorbing coloring agent A-27 were mixed in the contents described in Table 2, added to a twin-screw kneader having a diameter of 50 mm, melted at 280° C., and extruded. The extruded melt was allowed to pass through a gear pump and a filter (pore diameter of 20 μm) and extruded to a cooling roll at 20° C. from a die, thereby obtaining an unstretched (amorphous) film.

Further, the extruded melt was brought into close contact with the cooling roll using an electrostatic application method so that a film was molded.

Next, the solidified unstretched film was extruded on the cooling roll and sequentially biaxially stretched according to the same method as in Example 1, thereby obtaining a polyamide (nylon 6) film having a thickness of 180 μm as a resin molded article.

Examples 11 to 19 and Comparative Examples 7 to 12

Each film was prepared in the same manner as in Example 1 except that the kind of the specific infrared absorbing coloring agent, the content thereof, and the resin used therein in Example 1 were changed as those listed in Table 2 and a colorant as an additive was added as desired.

Example 20

A film was prepared in the same manner as in Example 10 except that the two kinds of the specific infrared absorbing coloring agents, the contents thereof, and the resin used therein in Example 10 were changed as those listed in Table 2.

[Evaluation of Resin Molded Article]

Each of the obtained films serving as resin molded articles was evaluated according to the following method.

Further, during the evaluation of each item, reference films E-1 to E-40 (corresponding to Examples 1 to 40) and E-40 to E-48 (corresponding to Comparative Examples 1 to 8) were prepared according to the same procedures as those in the examples except that the specific infrared absorbing coloring agent was not added in the corresponding examples and comparative examples respectively, and the amount of change in each film free from the near infrared absorbing coloring agent was acquired.

(1. Change in Tint)

The evaluation was performed based on the following standards after ΔEab values of the reference films E-1 to E-46 corresponding to the respective films of the examples and the comparative examples using a colorimeter MCPD-1000 (manufactured by Otsuka electronics Co., Ltd.).

In a case where the ΔEab value is small, this indicates that the amount of color change in the film resulting from containing the infrared absorbing coloring agent is small and the invisibility of the specific infrared absorbing coloring agent contained in the resin molded article is excellent. In the following evaluation standards, it is determined that the change in tint is suppressed and the invisibility of the infrared absorbing coloring agent is practically sufficient in the cases of the rank A and the rank B. The results are listed in Tables 1 and 2.

Further, the ΔEab value is a value acquired using the following color difference formula (The Color Science Handbook (1985), new edition, p. 266, edited by The Color Science Association of Japan) based on the CIE (Commission Internationale de l'Eclairage) 1976 (L*, a*, b*) space color system.

$$\Delta Eab = \{(\Delta L^*)2 + (\Delta a^*)2 + (\Delta b^*)2\}1/2$$

A: ΔEab value<3
B: 3≤ΔEab value<20
C: 20≤ΔEab value (2. Change in Infrared Absorption Amount)

The absorbance of the maximum absorption wavelength in a near infrared region of 730 nm to 1200 nm was measured with respect to each film of the examples and the comparative examples using a spectrophotometer UV-3100 (manufactured by Shimadzu Corporation), the measurement was also performed on the reference films E-1 to E-48 corresponding to the examples and the comparative examples, and the change rate was evaluated for each reference film. In a case where a difference in absorbance is large, this indicates that the infrared absorbing coloring agent remains. In the following evaluation standards, it is determined that a practically sufficient amount of infrared absorbing coloring agent remains in the cases of the rank A and the rank B. The results are listed in Tables 1 and 2.

A: Change rate>5%
B: 0.1%<change rate≤5%
C: Change rate<0.1%

(3. Heat Storage Property)

Each film of the examples and the comparative examples as a sample was placed on a styrofoam sample stand in an environment of 23° C. at 45% RH, and a thermocouple temperature sensor was inserted into a space between the sample and the sample stand.

Next, the sample surface was irradiated with light using a photo lamp "PRF-500WB" (manufactured by Panasonic Corporation) for 10 minutes from a distance of 30 cm above the sample surface (the surface of the resin film), and the temperature of the sample was measured using the thermocouple temperature sensor. In the same manner, the temperature of each reference film corresponding to each film of the examples and the comparative examples was measured, and a different in temperature between the films was acquired.

In a case where the temperature is high, this indicates that the heat storage property from the infrared absorbing coloring agent, in other words, the infrared absorption capacity is excellent.

The results thereof are listed in Tables 1 and 2.

TABLE 1

| | Resin composition | | | | | Performance evaluation | | |
| --- | --- | --- | --- | --- | --- | --- | --- | --- |
| | Near infrared absorbing coloring agent | | | Additive | | Change in tint | Change in infrared absorption amount | Heat storage property |
| | Coloring agent | Content (% by mass) | Resin | Colorant | Content (% by mass) | | | |
| Example 1 | A-4 | 0.3 | PET | — | — | B | A | 5.1° C. |
| Example 2 | A-6 | 4.5 | PET | C-1 | 0.1 | A | A | 8.1° C. |
| Example 3 | A-9 | 0.4 | PET | — | — | A | A | 5.2° C. |

TABLE 1-continued

| | Resin composition | | | | | Performance evaluation | | |
|---|---|---|---|---|---|---|---|---|
| | Near infrared absorbing coloring agent | | | Additive | | Change in tint | Change in infrared absorption amount | Heat storage property |
| | Coloring agent | Content (% by mass) | Resin | Colorant | Content (% by mass) | | | |
| Example 4 | A-12 | 0.6 | PET | C-2 | 0.1 | A | A | 5.5° C. |
| Example 5 | A-13 | 0.8 | PET | C-3 | 0.1 | A | A | 6.2° C. |
| Example 6 | A-16 | 0.4 | PET | — | — | A | A | 5.1° C. |
| Example 7 | A-18 | 0.3 | PET | — | — | A | A | 5.1° C. |
| Example 8 | A-18 | 2.5 | PET | — | — | A | A | 6.9° C. |
| Example 9 | A-22 | 1.2 | PET | C-5 | 0.3 | A | A | 6.4° C. |
| Example 10 | A-27 | 0.6 | PET | — | — | A | A | 6.2° C. |
| | A-13 | 0.5 | | | | | | |
| Comparative Example 1 | D-1 | 0.5 | PET | — | — | C | C | 0.1° C. |
| Comparative Example 2 | D-1 | 0.3 | PET | C-2 | 0.1 | C | C | 0.2° C. |
| Comparative Example 3 | D-2 | 0.5 | PET | — | — | C | B | 2.3° C. |
| Comparative Example 4 | D-2 | 0.3 | PET | C-2 | 0.1 | C | B | 3.5° C. |
| Comparative Example 5 | A-4 | 0.1 | PET | — | — | B | B | 2.1° C. |
| Comparative Example 6 | A-4 | 7 | PET | — | — | C | A | 8.8° C. |

TABLE 2

| | Resin composition | | | | | Performance evaluation | | |
|---|---|---|---|---|---|---|---|---|
| | Near infrared absorbing coloring | | | Additive | | Change in tint | Change in infrared absorption amount | Heat storage property |
| | Coloring agent | Content (% by mass) | Resin | Colorant | Content (% by mass) | | | |
| Example 11 | A-4 | 0.3 | Polyamide | — | — | B | A | 5.2° C. |
| Example 12 | A-6 | 4.5 | Polyamide | C-1 | 0.1 | A | A | 7.9° C. |
| Example 13 | A-9 | 0.4 | Polyamide | — | — | A | A | 5.3° C. |
| Example 14 | A-12 | 0.6 | Polyamide | C-2 | 0.1 | A | A | 5.5° C. |
| Example 15 | A-13 | 0.8 | Polyamide | C-3 | 0.1 | A | A | 5.9° C. |
| Example 16 | A-16 | 0.4 | Polyamide | — | — | A | A | 5.8° C. |
| Example 17 | A-18 | 0.3 | Polyamide | — | — | A | A | 5.1° C. |
| Example 18 | A-18 | 2.5 | Polyamide | — | — | A | A | 6.8° C. |
| Example 19 | A-22 | 1.7 | Polyamide | C-5 | 0.3 | A | A | 6.2° C. |
| Example 20 | A-27 | 0.6 | Polyamide | — | — | A | A | 6.1° C. |
| | A-13 | 0.5 | Polyamide | | | | | |
| Comparative Example 7 | D-1 | 0.5 | Polyamide | — | — | C | C | 0.1° C. |
| Comparative Example 8 | D-1 | 0.3 | Polyamide | C-2 | 0.1 | C | C | 0.2° C. |
| Comparative Example 9 | D-2 | 0.5 | Polyamide | — | — | C | B | 2.4° C. |
| Comparative Example 10 | D-2 | 0.3 | Polyamide | C-2 | 0.1 | C | B | 3.3° C. |
| Comparative Example 11 | A-4 | 0.1 | Polyamide | — | — | B | B | 2.1° C. |
| Comparative Example 12 | A-4 | 7 | Polyamide | — | — | C | A | 8.7° C. |

As shown in the results of Tables 1 and 2, it was found that each resin molded article in Examples 1 to Example 20 in which the infrared absorption capacity was maintained was obtained without impairing the tint of the resin or the tint of the colorant contained in the resin by using the resin composition containing the specific infrared absorbing coloring agent which is the compound represented by Formula (1) in the amount defined in the present disclosure.

Meanwhile, in the resin molded articles of Comparative Examples 1 to 4 and Comparative Examples 7 to 10 which were obtained by using a near infrared absorbing coloring agent other than the specific infrared absorbing coloring agent, the tint was changed and the heat resistance and the near infrared absorbing coloring agent was degraded.

Further, even in a case where the specific infrared absorbing coloring agent was contained, in the resin molded articles of Comparative Examples 5 and 11 in which the content of the coloring agent did not satisfy the amount defined in the present disclosure, the heat storage property due to the infrared absorption capacity was degraded. Further, it was found that the resin molded articles of Comparative Examples 6 and 12 in which the content of the specific infrared absorbing coloring agent was larger than the amount defined in the present disclosure showed a large change in tint.

Based on the above-described results, it was found that since the resin film which is the resin molded article obtained by being heated, melted, and kneaded has infrared absorption capacity, the specific infrared absorbing coloring agent is a stable infrared absorbing coloring agent having heat resistance that enables the film to withstand a high temperature condition.

The entirety of the disclosure of JP2017-050488 filed on Mar. 15, 2017 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A resin composition comprising:
at least one near infrared absorbing coloring agent selected from compounds represented by Formula (1); and
a resin,
wherein a content of the near infrared absorbing coloring agent is in a range of 0.3% by mass to 4.5% by mass with respect to a total amount of the resin composition, and
a content of the resin is in a range of 95.5% by mass to 99.7% by mass with respect to a total amount of the resin composition,

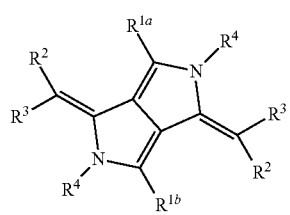

(1)

in Formula (1), $R^{1a}$ and $R^{1b}$ each independently represent an alkyl group, an aryl group, or a heteroaryl group, and
a plurality of $R^2$'s and $R^3$'s each independently represent a hydrogen atom or a monovalent substituent, at least one of $R^2$ or $R^3$ represents an electron-withdrawing group, $R^2$ and $R^3$ may be bonded to each other to form a ring, a plurality of $R^4$'s each independently represent a hydrogen atom, an alkyl group, an aryl group, a heteroaryl group, substituted boron, or a metal atom, and $R^4$ may be bonded to at least one selected from $R^{1a}$, $R^{1b}$, or $R^3$ through a covalent bond or a coordinate bond.

2. The resin composition according to claim 1,
wherein the compound represented by Formula (1) is a compound represented by Formula (3),

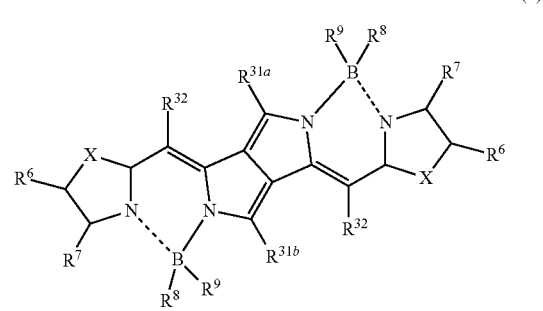

(3)

in Formula (3), a plurality of $R^{31a}$'s and $R^{31b}$'s each independently represent an alkyl group, an aryl group, or a heteroaryl group,
a plurality of $R^{32}$'s represent a hydrogen atom or a monovalent substituent, at least one $R^{32}$ represents an electron-withdrawing group, a plurality of $R^6$'s and $R^7$'s each independently represent a hydrogen atom, an alkyl group, an aryl group, or a heteroaryl group, $R^6$ and $R^7$ may be bonded to each other to form a ring, and a plurality of $R^8$'s and $R^9$'s each independently represent an alkyl group, an alkoxy group, an aryl group, or a heteroaryl group, and
a plurality of X's each independently represent an oxygen atom, a sulfur atom, —NR—, or CRR'—, and R and R' each independently represent a hydrogen atom, an alkyl group, or an aryl group.

3. The resin composition according to claim 1,
wherein the resin contains at least one selected from polyester, polyamide, or polyurethane.

4. A resin molded article which is prepared by using a resin composition of claim 1 that is a kneaded material, the resin molded article comprising:
at least one near infrared absorbing coloring agent selected from compounds represented by Formula (1); and
a resin,
wherein a content of the near infrared absorbing coloring agent is in a range of 0.3% by mass to 5% by mass with respect to a total amount of the resin composition,

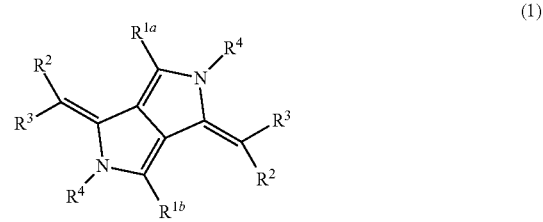

(1)

in Formula (1), $R^{1a}$ and $R^{1b}$ each independently represent an alkyl group, an aryl group, or a heteroaryl group, and a plurality of $R^2$'s and $R^3$'s each independently represent a hydrogen atom or a monovalent substituent, at least one of $R^2$ or $R^3$ represents an electron-withdrawing group, $R^2$ and $R^3$ may be bonded to each other to form a ring, a plurality of $R^4$'s each independently represent a hydrogen atom, an alkyl group, an aryl group, a heteroaryl group, substituted boron, or a metal atom, and $R^4$ may be bonded to at least one selected from $R^{1a}$, $R^{1b}$, or $R^3$ through a covalent bond or a coordinate bond.

5. The resin molded article according to claim 4, which is a synthetic fiber.

6. A method of producing a resin molded article of claim 4, comprising:

a step of heating and kneading at least one near-infrared absorbing coloring agent selected from compounds represented by Formula (1) and a resin to obtain a resin kneaded material, wherein a content of the near infrared absorbing coloring agent is in a range of 0.3% by mass to 5% by mass with respect to a total amount of the resin kneaded material; and a step of molding the obtained resin kneaded material,

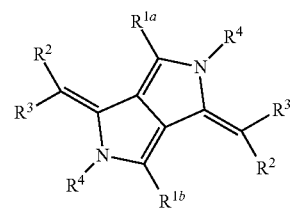

(1)

in Formula (1), $R^{1a}$ and $R^{1b}$ each independently represent an alkyl group, an aryl group, or a heteroaryl group, and a plurality of $R^2$'s and $R^3$'s each independently represent a hydrogen atom or a monovalent substituent, at least one of $R^2$ or $R^3$ represents an electron-withdrawing group, $R^2$ and $R^3$ may be bonded to each other to form a ring, a plurality of $R^4$'s each independently represent a hydrogen atom, an alkyl group, an aryl group, a heteroaryl group, substituted boron, or a metal atom, and $R^4$ may be bonded to at least one selected from $R^{1a}$, $R^{1b}$, or $R^3$ through a covalent bond or a coordinate bond.

* * * * *